US012810532B2

(12) United States Patent
El-Barkouky et al.

(10) Patent No.: US 12,810,532 B2
(45) **Date of Patent: *Nov. 24, 2026**

(54) METHODS, SYSTEMS, AND MEDIA FOR GENERATING IMAGES OF MULTIPLE SIDES OF AN OBJECT

(71) Applicant: COGNEX CORPORATION, Natick, MA (US)

(72) Inventors: Ahmed El-Barkouky, Hopkinton, MA (US); James A. Negro, Arlington, MA (US); Xiangyun Ye, Framingham, MA (US)

(73) Assignee: COGNEX CORPORATION, Natick, MA (US)

( * ) Notice: Subject to any disclaimer, the term of this patent is extended or adjusted under 35 U.S.C. 154(b) by 133 days.

This patent is subject to a terminal disclaimer.

(21) Appl. No.: 18/809,524

(22) Filed: Aug. 20, 2024

(65) Prior Publication Data

US 2025/0200868 A1 Jun. 19, 2025

Related U.S. Application Data

(63) Continuation of application No. 17/837,998, filed on Jun. 10, 2022, now Pat. No. 12,073,506.

(Continued)

(51) Int. Cl.
*G06T 15/10* (2011.01)
*G06T 3/04* (2024.01)

(Continued)

(52) U.S. Cl.
CPC ................ *G06T 15/10* (2013.01); *G06T 3/04* (2024.01); *G06T 7/70* (2017.01); *G06T 17/00* (2013.01);

(Continued)

(58) Field of Classification Search
CPC .. G06F 30/00; G06F 3/04815; G06F 3/04845; G06F 2203/04802; G06F 30/13;

(Continued)

(56) References Cited

U.S. PATENT DOCUMENTS 9,102,055 B1 * 8/2015 Konolige .................. G06T 7/13
9,305,231 B2 4/2016 Marrion et al.

(Continued)

OTHER PUBLICATIONS

MVTec Software GmbH, Halcon Application Note—Machine Vision in World Coordinates, Copyright 2003-2008, 144 pages.

(Continued)

*Primary Examiner* — Gordon G Liu
(74) *Attorney, Agent, or Firm* — Quarles & Brady LLP

(57) ABSTRACT

In accordance with some embodiments of the disclosed subject matter, methods, systems, and media for generating images of multiple sides of an object are provided. In some embodiments, a method comprises receiving information indicative of a 3D pose of a first object in a first coordinate space at a first time; receiving a group of images captured using at least one image sensor, each image associated with a field of view within the first coordinate space; mapping at least a portion of a surface of the first object to a 2D area with respect to the image based on the 3D pose of the first object; associating, for images including the surface, a portion of that image with the surface of the first object based on the 2D area; and generating a composite image of the surface using images associated with the surface.

20 Claims, 16 Drawing Sheets

Related U.S. Application Data

(60) Provisional application No. 63/209,374, filed on Jun. 10, 2021.

(51) Int. Cl.
*G06T 7/70* (2017.01)
*G06T 17/00* (2006.01)

(52) U.S. Cl.
CPC *G06T 2200/08* (2013.01); *G06T 2207/10028* (2013.01); *G06T 2207/20224* (2013.01); *G06T 2210/56* (2013.01)

(58) Field of Classification Search
CPC ......... G06T 2215/12; G06T 2219/2004; G06T 2210/56; G06T 17/00; G06T 7/70; G06T 13/205; G06T 15/10; G06T 15/20; G06T 19/006; G06T 19/20; G06T 2219/008; G06T 225/16; G06T 22/1912; G06T 3/04; G06T 2200/08; G06T 2207/08; G06T 2207/20274; G06T 2207/10028; G06T 3/4038; G06T 15/04; G06T 19/00; G06T 3/06
USPC .......................................................... 345/427
See application file for complete search history.

(56) References Cited

U.S. PATENT DOCUMENTS

| | | | |
|---|---|---|---|
| 10,776,972 B2 | 9/2020 | Negro et al. | |
| 11,335,021 B1 | 5/2022 | Vaidya et al. | |
| 2014/0270539 A1 | 9/2014 | Wang et al. | |
| 2015/0347802 A1 | 12/2015 | Wang et al. | |
| 2017/0046873 A1 | 2/2017 | Terry et al. | |
| 2018/0005392 A1 | 1/2018 | Gao | |
| 2018/0040150 A1 | 2/2018 | Saporetti | |
| 2019/0073785 A1 | 3/2019 | Hafner et al. | |
| 2019/0333259 A1 | 10/2019 | Negro et al. | |
| 2021/0125373 A1 | 4/2021 | Gauthier et al. | |
| 2021/0185233 A1 | 6/2021 | Kempf et al. | |
| 2022/0148153 A1 | 5/2022 | Zhu et al. | |
| 2022/0301192 A1* | 9/2022 | Boardman | G06T 7/579 |

OTHER PUBLICATIONS

PCT International Search Report and Written Opinion, PCT/US2022/033098, Oct. 5, 2022, 19 pages.

* cited by examiner $$s\begin{bmatrix}x_i\\y_i\\1\end{bmatrix}=\underbrace{\begin{bmatrix}\propto & \gamma & u_o\\0 & \beta & v_o\\0 & 0 & 1\end{bmatrix}}_{Intrinsics}\underbrace{\begin{bmatrix}R_{11} & R_{12} & R_{13} & t_x\\R_{21} & R_{22} & R_{23} & t_y\\R_{31} & R_{32} & R_{33} & t_z\end{bmatrix}}_{Extrinsics}\begin{bmatrix}X_f\\Y_f\\Z_f\\1\end{bmatrix}$$

METHODS, SYSTEMS, AND MEDIA FOR GENERATING IMAGES OF MULTIPLE SIDES OF AN OBJECT

CROSS-REFERENCE TO RELATED APPLICATIONS

This application is a continuation of U.S. patent application Ser. No. 17/837,998, filed on Jun. 22, 2023, and is based on, claims the benefit of, and claims priority to U.S. Provisional Application No. 63/209,374, filed Jun. 10, 2021, all of which are hereby incorporated herein by reference in their entirety for all purposes.

STATEMENT REGARDING FEDERALLY SPONSORED RESEARCH

N/A

BACKGROUND

The present technology relates to imaging systems, including machine vision systems that are configured to acquire and analyze images of objects or symbols (e.g., barcodes).

Machine vision systems are generally configured for use in capturing images of objects or symbols and analyzing the images to identify the objects or decode the symbols. Accordingly, machine vision systems generally include one or more devices for image acquisition and image processing. In conventional applications, these devices can be used to acquire images, or to analyze acquired images, such as for the purpose of decoding imaged symbols such as barcodes or text. In some contexts, machine vision and other imaging systems can be used to acquire images of objects that may be larger than a field of view (FOV) for a corresponding imaging device and/or that may be moving relative to an imaging device.

SUMMARY

In accordance with some embodiments of the disclosed subject matter, methods, systems, and media for generating images of multiple sides of an object are provided.

In accordance with some embodiments of the disclosed subject matter, a method for generating images of one or more sides of an object is provided, the method comprising: (i) receiving information indicative of a three dimensional (3D) pose of a first object in a first coordinate space at a first time; (ii) receiving a group of images captured using at least one image sensor associated with one or more surfaces of the object, wherein each image is associated with a field of view within the first coordinate space; (iii) mapping, for each image of the group of images, at least a portion of a surface of the first object to a 2D area with respect to the image based on the information indicative of the 3D pose of the first object in the first coordinate space; (iv) associating, for each image of the group of images that includes at least a portion of the surface of the first object within the image, a portion of that image with the surface of the first object based on the 2D area; and (v) generating a composite image of the surface of the first object using a set of images associated with the surface of the first object.

In some embodiments, the method further comprises: repeating (i) to (v) for a multitude of objects.

In some embodiments, the multitude of objects are objects conveyed past the at least one imaging device via a conveyor.

In some embodiments, the method further comprises: repeating (ii) through (v) for multiple surfaces of the first object.

In some embodiments, mapping the portion of the surface of the first object to the 2D area with respect to the image comprises: mapping a 3D location of a plurality of corners of the first object to a 2D location with respect to the image based on the information indicative of the 3D pose of the first object in the first coordinate space; and determining a portion of the image corresponding to the surface based on the 3D locations of the plurality of corners.

In some embodiments, mapping the portion of the surface of the first object to the 2D area with respect to the image comprises transforming at least one 3D location in the first coordinate space into a 2D location in an image coordinate space associated with an image in the group of images.

In some embodiments, receiving information indicative of the 3D pose of the first object comprises a 3D location of at least one corner of the first object in the first coordinate space.

In some embodiments, the method further comprises receiving information indicative of dimensions of the first object.

In some embodiments, the information indicative of the 3D pose of the first object is received from a dimensioning system.

In some embodiments, the information indicative of the 3D pose of the first object comprises point cloud data.

In some embodiments, the method further comprises: selecting, from the group of images, a set of images that include a particular surface of the object, wherein the set of images includes fewer images than the group of images.

In some embodiments, the set of images includes all images that include the particular surface of the object.

In some embodiments, the set of images includes fewer than all images that include the particular surface, and excludes at least one image of the group of images that includes the same portion of the particular surface that is depicted in an image in the set of images.

In some embodiments, the method further comprises: generating a 3D model of the object based on information indicative of dimensions of the first object; associating each of the composite images with a face of the 3D model; and causing a visualization of the object to be presented.

In some embodiments, the method further comprises: causing at least the images used to generate the composite image of each of multiple surfaces of first object to be saved in memory; causing a composite image of a first surface of the first object to be presented; receiving a selection of a portion the composite image of the first surface; and in response to the selection, causing each image of the images used to generate the composite image of first side to be presented.

In some embodiments, each portion of the composite image of the first surface is associated with information identifying which images saved in memory depict that portion of the first surface.

In some embodiments, generating the composite image of the surface of the first object using the set of images associated with that surface of the object comprises: removing a portion of each image of the set of images associated with the surface that do not depict the surface based on the information indicative of a 3D pose of the first object; transforming a portion of each image of the set of images associated with the surface that depicts the surface; associating the transformed portion of each image of the set of images with a corresponding portion of the composite image; and refining an alignment of the transformed portions of the images based on image data of the transformed portions.

In some embodiments, the method further comprises: blending portions of transformed portions of images based on image data of the transformed portions.

In accordance with some embodiments of the disclosed subject matter, a system for generating images of one or more sides of an object is provided, the system comprising: at least one hardware processor that is programmed to: (i) receive information indicative of a three dimensional (3D) pose of a first object in a first coordinate space at a first time; (ii) receive a group of images captured using at least one image sensor associated with one or more surfaces of the object, wherein each image is associated with a field of view within the first coordinate space; (iii) map, for each image of the group of images, at least a portion of a surface of the first object to a 2D area with respect to the image based on the information indicative of the 3D pose of the first object in the first coordinate space; (iv) associate, for each image of the group of images that includes at least a portion of the surface of the first object within the image, a portion of that image with the surface of the first object based on the 2D area; and (v) generate a composite image of the surface of the first object using a set of images associated with the surface of the first object.

In some embodiments, the system further comprises: an imaging device comprising the at least one image sensor, wherein the imaging device is programmed to: capture a plurality of images; and transmit the plurality of images to a computing device comprising the at least one hardware processor.

In some embodiments, the system further comprises: a dimensioning device that is programmed to: determine dimensions and a location of an object supported by a support structure; calculate locations of corners of the object in the first coordinate space; and transmit the locations of corners of the object in the first coordinate space to a computing device comprising the at least one processor.

In some embodiments, the at least one processor is further programmed to: repeat (i) to (v) for a multitude of objects.

In some embodiments, the multitude of objects are objects conveyed past the at least one imaging device via a conveyor.

In accordance with some embodiments of the disclosed subject matter, a non-transitory computer readable medium containing computer executable instructions that, when executed by a processor, cause the processor to perform a method for generating images of one or more sides of an object is provided, the method comprising: (i) receiving information indicative of a three dimensional (3D) pose of a first object in a first coordinate space at a first time; (ii) receiving a group of images captured using at least one image sensor associated with one or more surfaces of the object, wherein each image is associated with a field of view within the first coordinate space; (iii) mapping, for each image of the group of images, at least a portion of a surface of the first object to a 2D area with respect to the image based on the information indicative of the 3D pose of the first object in the first coordinate space; (iv) associating, for each image of the group of images that includes at least a portion of the a surface of the first object within the image, a portion of that image with the surface of the first object based on the 2D area; and (v) generating a composite image of the surface of the first object using a set of images associated with the surface of the first object.

BRIEF DESCRIPTION OF THE DRAWINGS

Various objects, features, and advantages of the disclosed subject matter can be more fully appreciated with reference to the following detailed description of the disclosed subject matter when considered in connection with the following drawings, in which like reference numerals identify like elements.

DETAILED DESCRIPTION

Machine vision systems can include multiple imaging devices. For example, in some embodiments, a machine vision system can be implemented in a tunnel arrangement (or system) which can include a structure on which each of the imaging devices can be positioned at an angle relative to a support resulting in an angled field of view (FOV). The multiple imaging devices within a tunnel system can be used to acquire image data of a common scene (e.g., including an object). In some embodiments, the common scene can include a relatively small area such as, for example, a tabletop (e.g., in lieu of a dynamic tunnel) or a discrete section of a transport system. In some embodiments, in a tunnel system there may be overlap between the fields of view of some of the imaging devices.

In some embodiments, a tunnel system can be utilized to capture multiple images of an object, and an image processing device (e.g., a separate computing device, one of the imaging devices) can be configured to generate a composite image of the object based using multiple images of the object. In some embodiments, mechanisms described herein can utilize information about the location of the object to select images to use to generate a composite image. For example, as described below, an image processing device can determine which images include a surface of an object using information indicative of the location of the one or more elements (e.g., corners, edges, surfaces) of the object (and/or elements of a bounding box drawn around the object). As another example, an image processing device can determine which portion of an object's surface is included in various images using information indicative of the location of the corners of the object (and/or the corners of a bounding box drawn around the object), and can at least partially align image data from multiple images depicting the surface using the information indicative of the location of the corners of the object (e.g., prior to performing any image analysis to align the images).

Figure 1A:
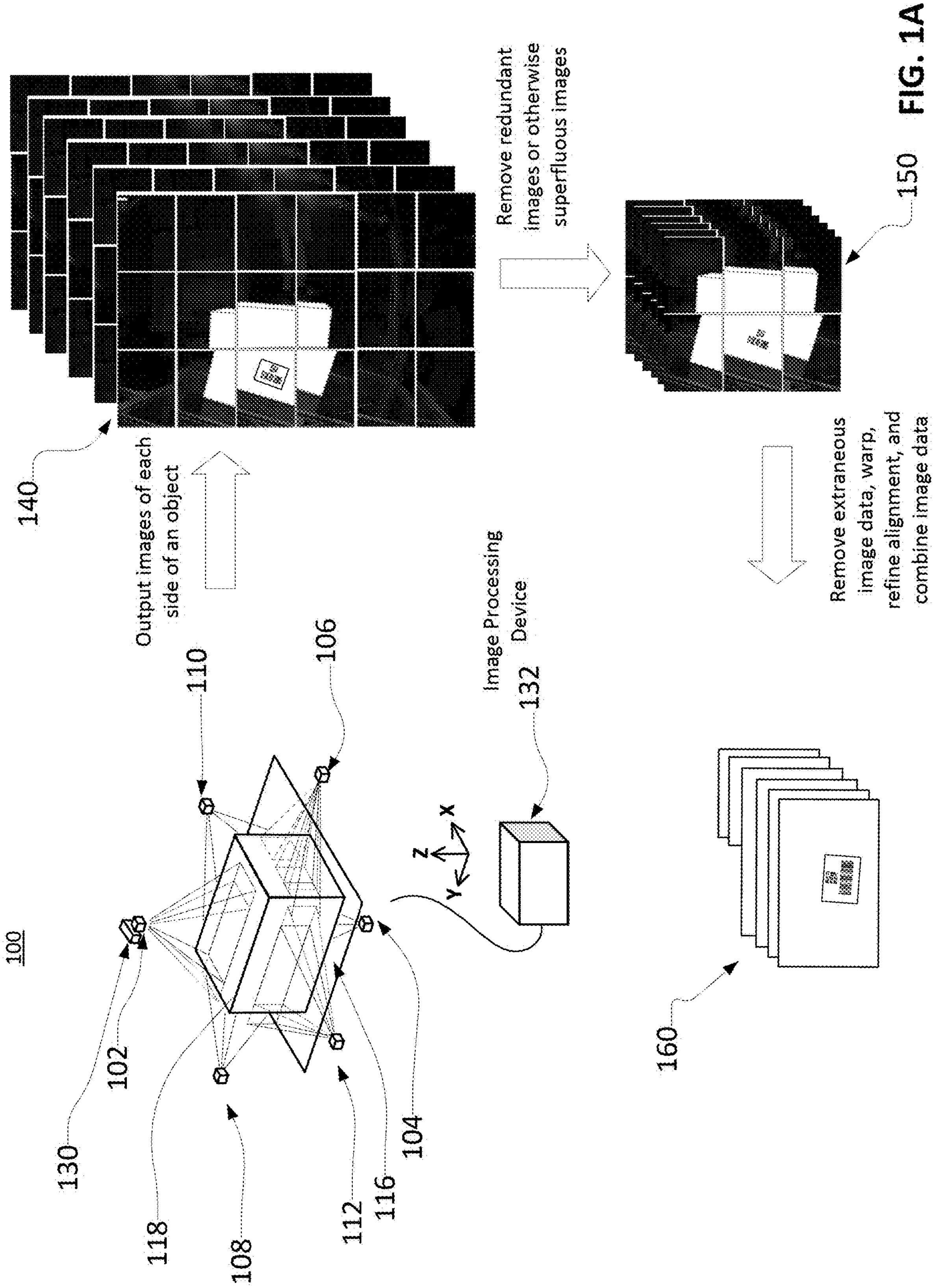
FIG. 1A shows an example of a system for capturing multiple images of each side of an object and generating images of multiple sides of the object in accordance with some embodiments of the disclosed subject matter.

FIG. 1A shows an example of a system 100 for capturing multiple images of each side of an object and generating images of multiple sides of the object in accordance with some embodiments of the disclosed subject matter.

In some embodiments, system 100 can include multiple imaging devices 102, 104, 106, 108, 110, and 112, which can each include one or more image sensors, at least one lens arrangement, and at least one control device (e.g., a processor device) configured to execute computational operations relative to the image sensor. In some embodiments, imaging devices 102, 104, 106, 108, 110, and/or 112 can include and/or be associated with a steerable mirror (e.g., as described in U.S. application Ser. No. 17/071,636, filed on Oct. 15, 2020, which is hereby incorporated herein by reference in its entirety). Each of imaging devices 102, 104, 106, 108, 110, and/or 112 can selectively acquire image data from different fields of view (FOVs), corresponding to different orientations of the associated imaging devices and/or steerable mirror(s). In some embodiments, system 100 can be utilized to acquire multiple images of each side of an object, where one or more portions of each image may overlap one or more other images captured of that side of the object. As described below in connection with FIG. 7, the multiple images of each side can be used to generate a composite representation of that side (e.g., without reduced distortion) with relatively high resolution (e.g., compared to single image captured with a FOV that includes all of that side). For example, each pixel of the composite image can represent a smaller portion of the object than would be possible if a single image of the entire side were captured using a similar imaging device with a wider field of view. As another example, overlapping images can be used to generate a super-resolution representation that has a higher resolution (e.g., more pixels per mm) than the source images used to generate the super-resolution representation.

In some embodiments, system 100 can be used to acquire images of an object that is presented for image acquisition. For example, system 100 can include a support structure (not shown) that supports each of the imaging devices 102, 104, 106, 108, 110, 112 and a platform 116 configured to support an object 118 to be imaged (note that object 118 may be associated with one or more symbols, such as a barcode, other types of 1-dimensional code, a QR code, other types of 2-dimensional codes, a fiducial, a hazmat code, alphanumeric code, other types of machine-readable codes, etc.). For example, the support structure for one or more of the imaging devices can be configured as a caged support structure, or in various other configurations. In some embodiments, support platform 116 can be configured to facilitate imaging of the bottom side of an object supported by support platform 116 (e.g., the side of object 118 resting on platform 116). For example, support structure 116 can be implemented using a transparent platform, a mesh or grid platform, an open center platform, or any other suitable configuration. Other than the presence of support structure 116, acquisition of images of the bottom side can be substantially similar to acquisition of other sides of the object.

In some embodiments, imaging devices 102, 104, 106, 108, 110, and/or 112 can be oriented such that a FOV of the imaging device can be used to acquire images of a particular side of an object resting on support platform 116, such that each side of an object (e.g., object 118) placed on and supported by support platform 116 can be imaged by imaging devices 102, 104, 106, 108, 110, and/or 112. For example, imaging device 102 can be mechanically coupled to a support structure above support platform 116, and can be oriented toward an upper surface of support platform 116, imaging device 104 can be mechanically coupled to a support structure below support platform 116, and imaging devices 106, 108, 110, and/or 112 can each be mechanically coupled to a side of a support structure, such that a FOV of each of imaging devices 106, 108, 110, and/or 112 faces a lateral side of support platform 116.

In some embodiments, each imaging device can be configured with an optical axis that is generally parallel with another imaging device, and perpendicular to other imaging devices. In some embodiments, the optical axis of a steerable mirror can be generally parallel when the steerable mirror is in a neutral position. For example, imaging devices 102 and 104 can be configured to face each other (e.g., such that the imaging devices have substantially parallel optical axes), and the other imaging devices can be configured to have optical axes that are orthogonal to the optical axes of imaging devices 102 and 104.

Note that although the illustrated mounting positions of the imaging devices 102, 104, 106, 108, 110, and 112 relative to one another can be advantageous, in some embodiments, imaging devices for imaging different sides of an object can be reoriented relative the illustrated positions of FIG. 1A (e.g., imaging devices can be offset, imaging devices can be placed at the corners, rather than the sides, etc.). Similarly, while there can be advantages (e.g., increased acquisition speed) associated with using six imaging devices that is each configured to acquire image data from a respective side of an object (e.g., the six sides of object 118), in some embodiments, a different number or arrangement of imaging devices, a different arrangement of mirrors (e.g., using fixed mirrors, using additional movable mirrors, etc.) can be used to configure a particular imaging device to acquire images of multiple sides of an object (e.g., as described below in connection with FIG. 5). For example, fixed mirrors disposed such that imaging devices 106 and 110 can capture images of a far side of object 118 can be used in lieu of imaging devices 108 and 112. As another example, one or more of imaging device 102, 104, 106, 108, 110, and/or 112 can be omitted, such that system 100 is configured to capture fewer sides of the object in a particular operation. In such an example, a user can adjust an orientation of object 118 to facilitate imaging of one or more other sides. Alternatively, system 100 can capture images of one or more sides of object 118, and can omit capturing one or more other sides of object 118.

In some embodiments, an imaging device that is dedicated to acquiring images of a particular side of an object (e.g., as shown in FIG. 1A) can be configured to acquire images only of that side of the object. In some embodiments, an imaging device can be dedicated to acquire images of multiple sides of an object, including with overlapping acquisition areas relative to other imaging devices included in the same system. In some embodiments, an imaging device can be configured with a steerable FOV that facilitates acquisition of a relatively small portion of a side of an object, with the potential to acquire one or more images of a particular region of interest or to acquire multiple overlapping images of the same side of the object via control of a steerable mirror.

In some embodiments, system 100 can be configured to image objects having a wide variety of sizes, and accordingly, can be configured to capture many overlapping images to cover a relatively large FOV. For example, as shown in FIG. 1A, the FOV of each imaging device 102, 104, 106, 108, 110, and 112 can be substantially smaller than (e.g., less than 25% of) the surface area of a respective side of object 118, which may facilitate acquisition of relatively high resolution images (e.g., each pixel corresponding to a relatively small portion of the object) of multiple portions of object 118, facilitating generation of a relatively high resolution composite image of each side of object 118. In such an example, using mechanisms described herein, relatively low resolution imaging devices can be used to implement imaging devices 102, 104, 106, 108, 110, and 112 while facilitating generation of relatively high resolution images of each side of an object, as the same resolution can be used to capture an image of a smaller portion of the object such that each pixel represents a smaller portion of the object.

For example, an imaging device, such as imaging device 106 can be used to acquire images of an entire surface of the side of an object facing imaging device 106 (and/or a portion of another side, if the object is placed at an oblique angle to imaging device 106) by successively acquiring image data for different spatial locations of the corresponding FOV of imaging device 106. In a more particular example, imaging device 106 can utilize a steerable mirror to successively shift the FOV. Such a process can proceed iteratively (e.g., movement of the mirror and FOV, followed by acquisition of image data at each location) until image data is acquired for a large portion of a particular side (e.g., including at least three corners of the side of object 118, including at least 75% of the side of object 118, including at least an entire surface of the side of object 118, etc.). In some embodiments, if the object is placed such that one or more sides forms a relatively high angle with respect to an optical axis of one or more imaging devices, multiple imaging devices may capture images of the same side (and may capture images of multiple sides of the object). For example, if an object is placed offset at 45 degrees, imaging device 106 can capture images of two sides of the object, but may not be capable of capturing images of either entire side. In such an example, imaging device 110 can capture images of one side captured by imaging device 106, and imaging device 112 can capture images of the other side captured by imaging device 106.

In some embodiments, system 100 can include a dimensioning system 130 (sometimes referred to herein as a dimensioner) that can be configured to determine dimensions and/or a location of an object supported by support structure 116 (e.g., object 118). For example, dimensioner 130 can be configured to determine a distance from dimensioner 130 to a top surface of the object, and can be configured to determine a size and/or orientation of a surface facing dimensioner 130. In some embodiments, dimensioner 130 can be implemented using various technologies. For example, dimensioner 130 can be implemented using a 3D camera (e.g., a structured light 3D camera, a continuous time of flight 3D camera, etc.). As another example, dimensioner 130 can be implemented using a laser scanning system (e.g., a LiDAR system, a time-of-flight laser rangefinder, etc.). In a particular example, dimensioner 130 can be implemented using a 3D-A1000 system available from Cognex Corporation.

In some embodiments, dimensioner 130 can determine 3D coordinates of each corner of the object in a coordinate space defined with reference to one or more portions of system 100. For example, dimensioner 130 can determine 3D coordinates of each of eight corners of an object that is at least roughly cuboid and/or that can be approximated as cuboid in shape within a Cartesian coordinate space defined with an origin at dimensioner 130. As another example, dimensioner 130 can determine 3D coordinates of each of eight corners of an object that is at least roughly cuboid and/or that can be approximated as a cuboid in shape within a Cartesian coordinate space defined with respect to support platform 116 (e.g., with an origin that originates at a center of support platform 116). As yet another example, dimensioner 130 can determine 3D coordinates of a bounding box (e.g., having eight corners) of an object that is not a cuboid shape within any suitable Cartesian coordinate space (e.g., defined with respect to support platform 116, defined with respect to dimensioner 130, etc.). For example, dimensioner 130 can identify a bounding box around any suitable non-cuboid shape, such as a polybag, a jiffy mailer, an envelope, a cylinder (e.g., a circular prism), a triangular prism, a quadrilateral prism that is not a cuboid, a pentagonal prism, a hexagonal prism, a tire (or other shape that can be approximated as a toroid), etc. In some embodiments, dimensioner 130 can be configured to classify an object as a cuboid or non-cuboid shape, and can identify corners of the object for cuboid shapes or corners of a cuboid bounding box for non-cuboid shapes. In some embodiments, dimensioner 130 can be configured to classify an object as being to a particular class within a group of common objects (e.g., cuboid, cylinder, triangular prism, hexagonal prism, jiffy mailer, polybag, tire, etc.). In some such embodiments, dimensioner 130 can be configured to determine a bounding box based on the classified shape. In some embodiments, dimensioner 130 can determine 3D coordinates of non-cuboid shapes, such as soft-sided envelopes, pyramidal shapes (e.g., having four corners), other prisms (e.g., triangular prisms having six corners, quadrilateral prism that is not cuboid, pentagonal prisms having ten corners, hexagonal prims having 12 corners, etc.).

Additionally or alternatively, in some embodiments, dimensioner 130 can provide raw data (e.g., point cloud data, distance data, etc.) to a control device (e.g., control device 132 described below, one or more imaging devices), which can determine the 3D coordinates of one or more points of an object.

In some embodiments, each imaging device (e.g., imaging devices 102, 104, 106, 108, 110, and 112) can be calibrated (e.g., as described below in connection with FIGS. 8A to 8C) to facilitate mapping a 3D location of each corner of an object supported by support platform 116 (e.g., object 118) to a 2D location in an image captured by the imaging device. In some embodiments including a steerable mirror(s), such a calibration can be performed with the steerable mirror(s) in a particular orientation.

In some embodiments, a control device 132 (sometimes referred to herein as an image processing device) can coordinate operations of various components of system 100. For example, image processing device 132 can cause dimensioner 130 to acquire dimensions of an object supported by support platform 116, and can cause imaging devices 102, 104, 106, 108, 110, and 112 to capture images of each side. In some embodiments, image processing device 132 can control detailed operations of each imaging device, for example, by controlling a steerable mirror, providing trigger signals to cause the imaging device to capture images at particular times (e.g., when the object is expected to be within a field of view of the imaging devices), etc. Alternatively, in some embodiments, another device (e.g., a processor included in each imaging device, a separate controller device, etc.) can control detailed operations of each imaging device. For example, image processing device 132 (and/or any other suitable device) can provide a trigger signal to each imaging device and/or dimensioner 130, and a processor of each imaging device can be configured to implement a predesignated image acquisition sequence that spans a predetermined region of interest in response to the trigger. Note that system 100 can also include one or more light sources (not shown) to illuminate surfaces of an object, and operation of such light sources can also be coordinated by a central device (e.g., image processing device 132), and/or control can be decentralized (e.g., an imaging device can control operation of one or more light sources, a processor associated with one or more light sources can control operation of the light sources, etc.). For example, in some embodiments, system 100 can be configured to concurrently (e.g., at the same time or over a common time interval) acquire images of multiple sides of an object, including as part of a single trigger event. For example, each imaging device 102, 104, 106, 106, 108, 110, and 112 can be configured to acquire a respective set of one or more images over a common time interval. Additionally or alternatively, in some embodiments, imaging devices 102, 104, 106, 106, 108, 110, and 112 can be configured to acquire the images based on a single trigger event. For example, based on a sensor (e.g., a contact sensor, a presence sensor, an imaging device, etc.) determining that object 118 has been placed on support platform 116, imaging devices 102, 104, 106, 106, 108, 110, and 112 can concurrently acquire images of the respective sides of object 118. As another example, a trigger event can be initiated from operator input. In a more particular example, after placing object 118 on support platform 116, an operator can step out of the fields of view of imaging devices 102, 104, 106, 106, 108, 110, and/or 112, can electronically initiate image acquisition (e.g., by depressing a actuator).

In some embodiments, each imaging device can be configured to execute a predesignated image acquisition sequence that spans a predetermined region of interest, such as a predefined imaging region (e.g., an area that can be larger than the FOV of the imaging device at a particular imaging distance) using an iterative process described above. In such embodiments, the imaging devices can automatically capture multiple images of each side of objects of various sizes (e.g., objects having different heights, different widths, different depths, different positioning of respective objects, etc.). Additionally or alternatively, in some embodiments, an image acquisition sequence can be selected based on dimensions of the object (e.g., as determined by dimensioner 130). In such embodiments, each imaging device can be configured to implement an image acquisition sequence based on a distance from the imaging device to the object, the dimensions of the object, etc., to ensure that the object is captured at a sufficiently high resolution.

In some embodiments, each imaging device 102, 104, 106, 108, 110, and 112 can generate a set of images 140 depicting various FOVs of a particular side of an object supported by support platform 116 (e.g., object 118). In some embodiments, image processing device 132 can map 3D locations of one or more corners of object 118 to a 2D location within each image in a set of images 140 output by each imaging device (e.g., as described below in connection with FIGS. 9A and 9B, which shows multiple boxes on a conveyor). In some embodiments, image processing device can generate a mask that identifies which portion of an image is associated with each side (e.g., a bit mask with a 1 indicating the presence of a particular side, and a 0 indicating an absence of a particular side) based on the 2D location of each corner.

In some embodiments, image processing device 132 can identify which images include at least a portion of object 118 based on the mapping of the corners from the 3D coordinate space to the image coordinate space for each image, or any other suitable information that can be representative of a side, such as: multiple planes (e.g., each plane corresponding to a side, and the intersection of multiple planes representing edges and corners); coordinates of a single corner associated with a height, width, and depth; multiple polygons, etc. For example, image processing device 132 can map between surfaces of the object (e.g., a polygon defined by four corners) and portions of each image, and image processing device 132 can identify images that overlap at least a portion of one surface as an image that includes at least a portion of object 118. As another example, if the 2D location of one or more corners falls within a captured image, image processing device 132 can determine that at least a portion of the object is included in the image. As another example, image processing device 132 can identify which images include one or more edges of the object based on the 2D location of one or more corners. As yet another example, image processing device 132 can identify images that include a portion of only one side of the object without any corners or edges (e.g., when the FOV is relatively small compared to a surface of the object).

In some embodiments, image processing device 132 can select a subset 150 of each set of images 140 such that the subset does not include redundant images (e.g., images that only include a portion(s) of the object that is included in one or more other images that have been selected for inclusion in subset 150, images that add no additional coverage for that surface, and/or such that the subset does not include superfluous images (e.g., images that do not include any portion of a particular side associated with subset 150). For example, as described below in connection with FIG. 10, image processing device 132 can identify images that includes at least one edge, and of images that include each edge, can select the images that include the largest portion of the surface corresponding to a particular side associated with subset 150 for inclusion in subset 150. In such an example, image processing device 132 can identify images that do not include any edges, and can select an image(s) that includes a largest portion of the surface that does not overlap with an image with an edge selected for inclusion in subset 150, and can omit images that include only a portion(s) of the surface that overlaps a portion included in an image that has already been selected for inclusion in subset 150. As another example, image processing device 132 can identify images that includes information (e.g., a code, a label, an address block, etc.), and can preferentially select images that include a region enclosing the information (or enclosing more of the region than other images, and/or a highest quality representation of the information in the region). In such an example, image processing device 132 may attempt to locate such information prior to selecting images and/or concurrently with selecting images. Additionally or alternatively, image processing device may receive input from another device (e.g., an imaging device, another image processing device, etc.) indicating locations of information and/or likely locations.

In some embodiments, image processing device 132 can use each subset 150 to generate a composite image of a particular side. For example, image processing device 132 can select relevant image data (e.g., can omit image data that does not correspond to the side of the object associated with that subset 150), and can warp the selected image data to correct at least perspective distortion included in the selected image data. As another example, image processing device can apply a transformation (e.g., a non-linear transformation to correct lens distortion). In such an example, image processing device 132 can associate each selected portion of image data with a corresponding portion of the surface based on the 2D location of each corner with respect to the selected portion of image data, and can refine an alignment between neighboring regions of image data and/or blend neighboring regions of image data (e.g., using image processing techniques based on content of the image data). In some embodiments, image processing device 132 can warp the selection portion of each image, associate the selection portion with a corresponding portion of the surface, align with portions of other images, and blend the portions of images with adjacent portions of other images. In some embodiments, image processing device 132 can find one or more transformations, for example, to correct image data and align the image data with one or more adjacent images, for each image to be used in the generation of a composite image, and can delay applying the transformations until transformations have been found for multiple image portions from multiple images (e.g., all images used to generate a composite image), and can apply the transformations as a later operation (e.g., as applying the transformations to image data utilizes more computational resources than finding a transform and temporarily storing the transform in memory). For example, imaging processing device 132 can find a transformation to correct distortion (e.g., a transformation that can be used to warp a portion of image data to correct perspective distortion), and can find a transformation to align a portion of an image with a portion of an adjacent image, and/or any other suitable transforms, prior to applying the transformations.

Image processing device 132 can generate a set of composite images 160, each depicting a particular surface (e.g., side) of the object based on the aligned selected portions of the image data from each image from subset 150. In some embodiments, composite images 160 can be formatted in any suitable format. For example, each composite image can be saved as a separate image file (e.g., a .jpg file, a .png file, etc.), and composite images 160 can be associated with each other and/or with an object depicted in composite images 160 (e.g., identified based on a barcode or other symbol associated with the object, identified based on information provided by an operator of system 100, etc.). As another example, composite images 160 can be formatted as a single image (e.g., with zero padding between sides, without zero padding between sides, in a rectangular format as shown in FIG. 1A, in a cross-shaped format, etc.).

In a particular example, composite images 160, can be combined to generate a composite image of an entire object. For example, such a composite image can be generated using a relatively compact orientation, with various composite images 160 depicting each side organized in columns and rows. In another more particular example, a two-dimensional deconstruction of an object (e.g., object 118) with a central image being of a bottom side of the object can be constructed and, as appropriate, presented to a user for relatively quick analysis. Note that these are merely examples, and different sides of an object can be arranged within a composite image in a variety of ways that may or may not correspond to a simple unfolding or other manipulation of the object. In some embodiments, one or more composite images 160 and/or a composite image of the entire object generated using composite images 160 in its entirety, can be processed to locate or analyze (e.g., decode) a symbol.

In some embodiments, imaging processing device 132 (or any other suitable device, such as a local or remote server) can be configured to produce a 3D representation of a particular object. For example, a cuboid 3D model can be generated based on dimensions of the object acquired using dimensioner 130, and each composite image of composite images 160 can be associated with a face of the cuboid model.

Note that although FIG. 1A depicts a stationary support platform 116, one or more of these components can be configured to be movable (e.g., including one or more conveyors as described below in connection with FIGS. 4-6, including one or more transport systems, including one or more robot arms, etc.). For example, with appropriate modifications to a support and/or by utilizing different support structures, such as a tunnel described below in connection with FIG. 4, an array of imaging devices configured similarly to imaging devices 102, 104, 106, 108, 110, and 112 can be configured to acquire image data for each side of an object as it travels through a modified support cage. In some embodiments, a moving platform or support portion associated therewith can be transparent or omitted so that an imaging device positioned under the moving platform can receive light from the underside of the object as the object travels through an imaging area.

Figure 1B:
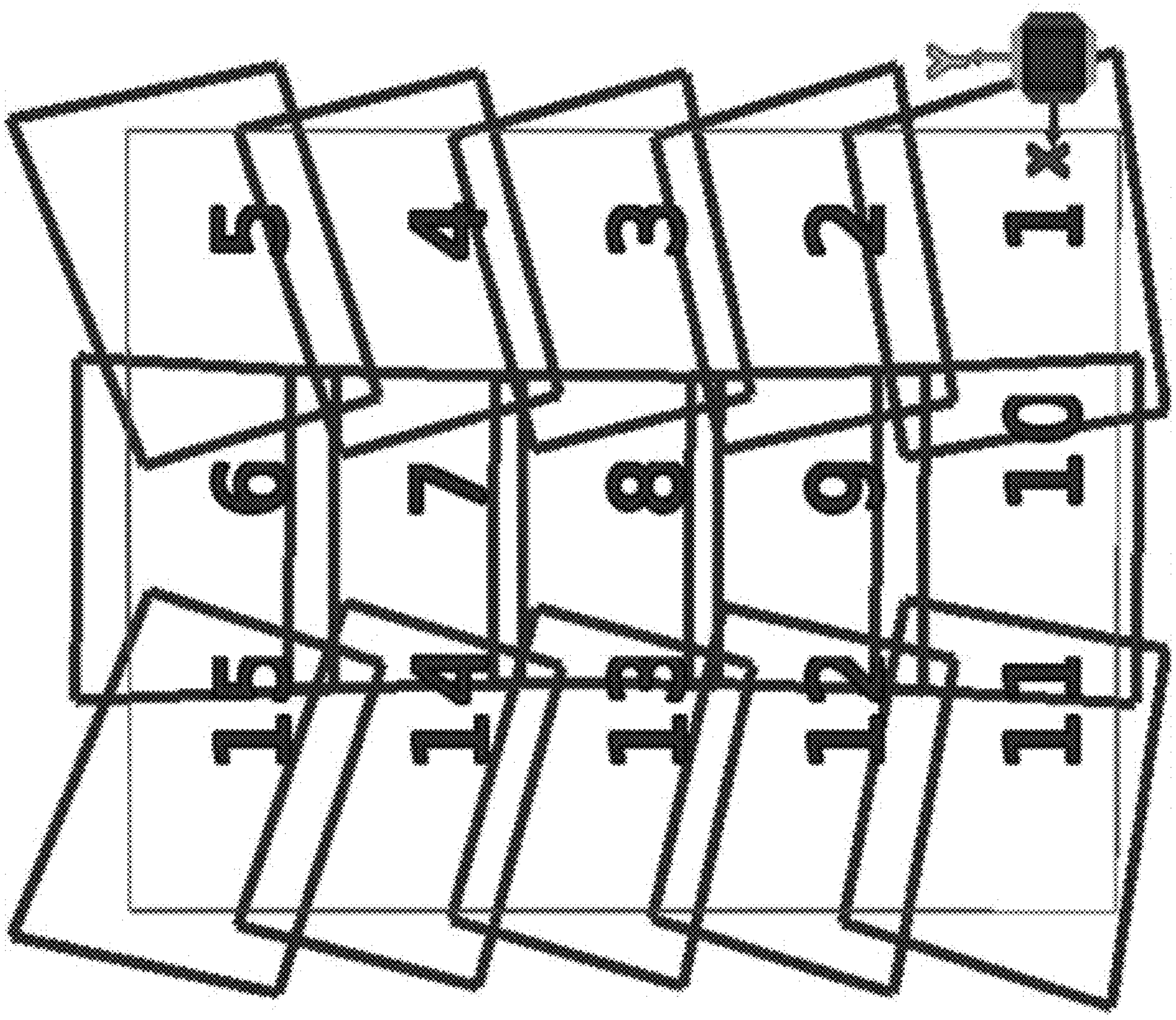
FIG. 1B shows an example of overlapping fields of view that can be imaged using the system of FIG. 1A to generate multiple images of a side of the object in accordance with some embodiments of the disclosed subject matter.

FIG. 1B shows an example of overlapping fields of view that can be imaged using the system of FIG. 1A to generate multiple images of a side of the object in accordance with some embodiments of the disclosed subject matter. As shown in FIG. 1B, each imaging device can be configured to capture many images (e.g., 15 images in FIG. 1B) that each overlaps one or more other images, such that an entire region of interest is collectively captured by the images.

Figure 2:
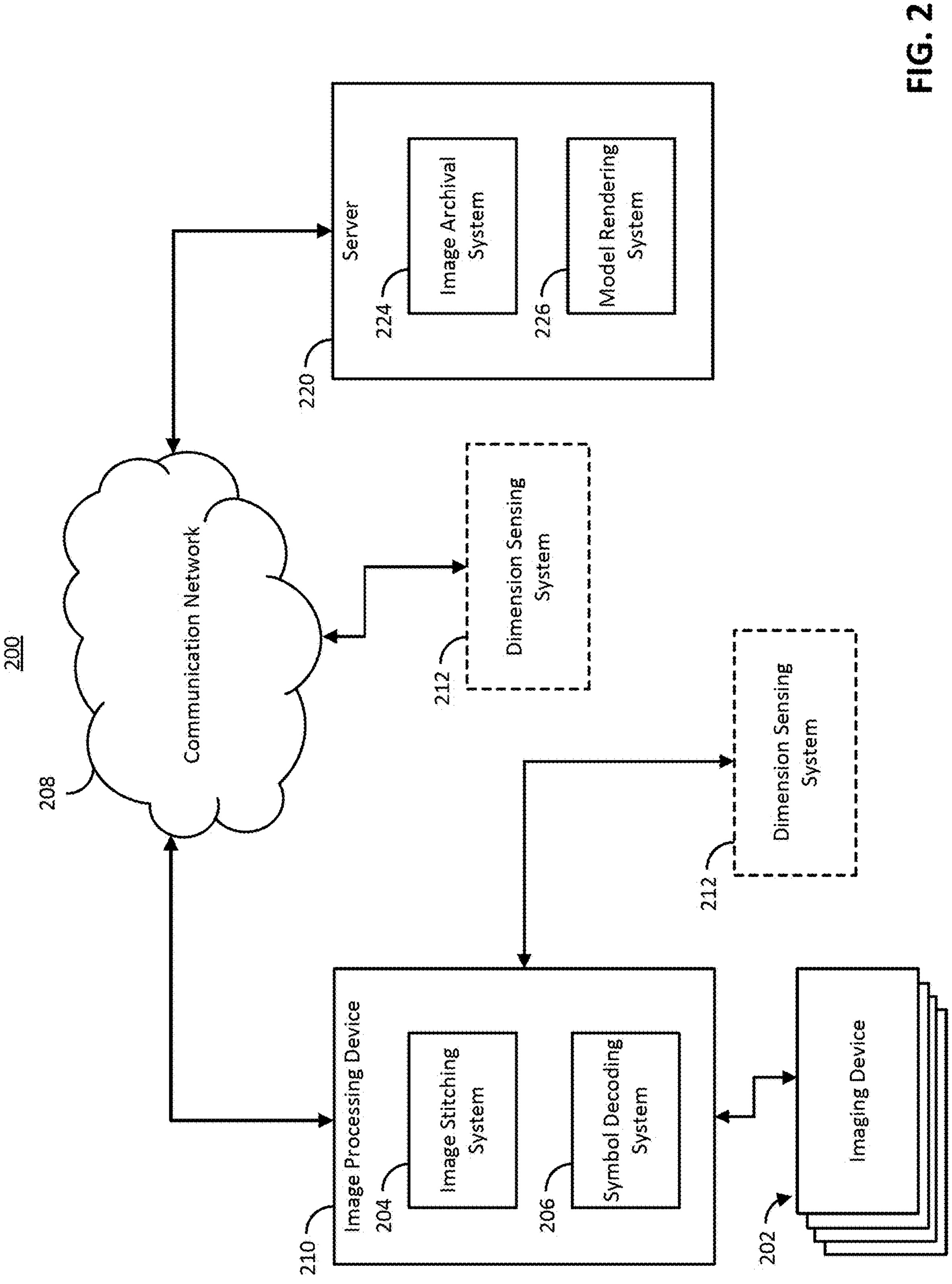
FIG. 2 shows an example of a system for generating images of multiple sides of an object in accordance with some embodiments of the disclosed subject matter.

FIG. 2 shows an example 200 of a system for generating images of multiple sides of an object in accordance with some embodiments of the disclosed subject matter. As shown in FIG. 2, an image processing device 210 (e.g., image processing device 132) can receive images from multiple imaging devices 202 (e.g., imaging devices 102, 104, 106, 108, 110, and/or 112 described above in connection with FIG. 1A, and/or imaging devices described below in connection with FIGS. 4 to 6). Additionally, image processing device 210 can receive dimension data about an object imaged by imaging devices 202 from a dimension sensing system 212 (e.g., dimensioner 130), which may be locally connected to image processing device 210 and/or connected via a network connection (e.g., via a communication network 208). Image processing device 210 can also receive input from any other suitable device, such as a motion measurement device (not shown) configured to output a value indicative of movement of a conveyor over a particular period of time which can be used to determine a distance that an object has traveled (e.g., between when dimensions were determined and when each image of the object is generated). A motion measurement device can be implemented using any suitable techniques or combination of techniques. For example, the motion measurement device can be implemented using an encoder. Image processing device 210 can also coordinate operation of one or more other devices, such as one or more light sources (not shown) configured to illuminate an object (e.g., a flash, a flood light, etc.).

In some embodiments, image processing device 210 can execute at least a portion of an image stitching system 204 to generate composite images (e.g., comprising portions of several images) depicting one or more sides of an object from a group of images associated with the respective side of the object. Additionally or alternatively, image processing device 210 can execute at least a portion of a symbol decoding system 206 to identify and/or decode symbols (e.g., barcodes, QR codes, text, etc.) associated with an object imaged by imaging devices 202 using any suitable technique or combination of techniques.

In some embodiments, image processing device 210 can execute at least a portion of image stitching system 204 to more efficiently generate composite images of one or more sides of an object using mechanisms described herein.

In some embodiments, image processing device 210 can communicate image data (e.g., composite image data generated by image stitching system 204) and/or data received from dimension sensing system 212 to a server 220 over communication network 208, which can execute at least a portion of an image archival system 224 and/or a model rendering system 226. In some embodiments, server 220 can use image archival system 224 to store image data received from image processing device 210 (e.g., for retrieval and inspection if the object is reported damaged, for further analysis such as an attempt to decode a symbol that could not be read by symbol decoding system 206 or to extract information from text associated with the object). Additionally or alternatively, in some embodiments, server 220 can use model rendering system 226 to generate 3D models of objects for presentation to a user.

In some embodiments, image processing device 210 and/or server 220 can be any suitable computing device or combination of devices, such as a desktop computer, a laptop computer, a smartphone, a tablet computer, a wearable computer, an imaging device (e.g., an imaging device 202), a server computer, a virtual machine being executed by a physical computing device, etc.

In some embodiments, imaging devices 202 can be any suitable imaging devices. For example, each including at least one imaging sensor (e.g., a CCD image sensor, a CMOS image sensor, or other suitable sensor), at least one lens arrangement, and at least one control device (e.g., a processor device) configured to execute computational operations relative to the imaging sensor. In some embodiments, a lens arrangement can include a fixed-focus lens. Additionally or alternatively, a lens arrangement can include an adjustable focus lens, such as a liquid lens or a known type of mechanically adjusted lens. Additionally, in some embodiments, imaging devices 202 can include a steerable mirror that can be used to adjust a direction of a FOV of the imaging device. In some embodiments, one or more imaging devices 202 can include a light source(s) (e.g., a flash, a high intensity flash, a light source described in U.S. Patent Application Publication No. 2019/0333259, etc.) configured to illuminate an object within a FOV.

In some embodiments, dimension sensing system 212 can be any suitable dimension sensing system. For example, dimension sensing system 212 can be implemented using a 3D camera (e.g., a structured light 3D camera, a continuous time of flight 3D camera, etc.). As another example, dimension sensing system 212 can be implemented using a laser scanning system (e.g., a LiDAR system). In some embodiments, dimension sensing system 212 can generate dimensions and/or 3D locations in any suitable coordinate space.

In some embodiments, imaging devices 202 and/or dimension sensing system 212 can be local to image processing device 210. For example, imaging devices 202 can be connected to imaging processing device 210 by a cable, a direct wireless link, etc. As another example, dimension sensing system 212 can be connected to imaging processing device 210 by a cable, a direct wireless link, etc. Additionally or alternatively, in some embodiments, imaging devices 202 and/or dimension sensing system 212 can be located locally and/or remotely from image processing device 210, and can communicate data (e.g., image data, dimension and/or location data, etc.) to image processing device 210 (and/or server 220) via a communication network (e.g., communication network 208). In some embodiments, one or more imaging devices 202, dimensioning system 212, image processing device 210, and/or any other suitable components can be integrated as a single device (e.g., within a common housing).

In some embodiments, communication network 208 can be any suitable communication network or combination of communication networks. For example, communication network 208 can include a Wi-Fi network (which can include one or more wireless routers, one or more switches, etc.), a peer-to-peer network (e.g., a Bluetooth network), a cellular network (e.g., a 3G network, a 4G network, a 5G network, etc., complying with any suitable standard, such as CDMA, GSM, LTE, LTE Advanced, NR, etc.), a wired network, etc. In some embodiments, communication network 108 can be a local area network (LAN), a wide area network (WAN), a public network (e.g., the Internet), a private or semi-private network (e.g., a corporate or university intranet), any other suitable type of network, or any suitable combination of networks. Communications links shown in FIG. 2 can each be any suitable communications link or combination of communications links, such as wired links, fiber optic links, Wi-Fi links, Bluetooth links, cellular links, etc.

Figure 3:
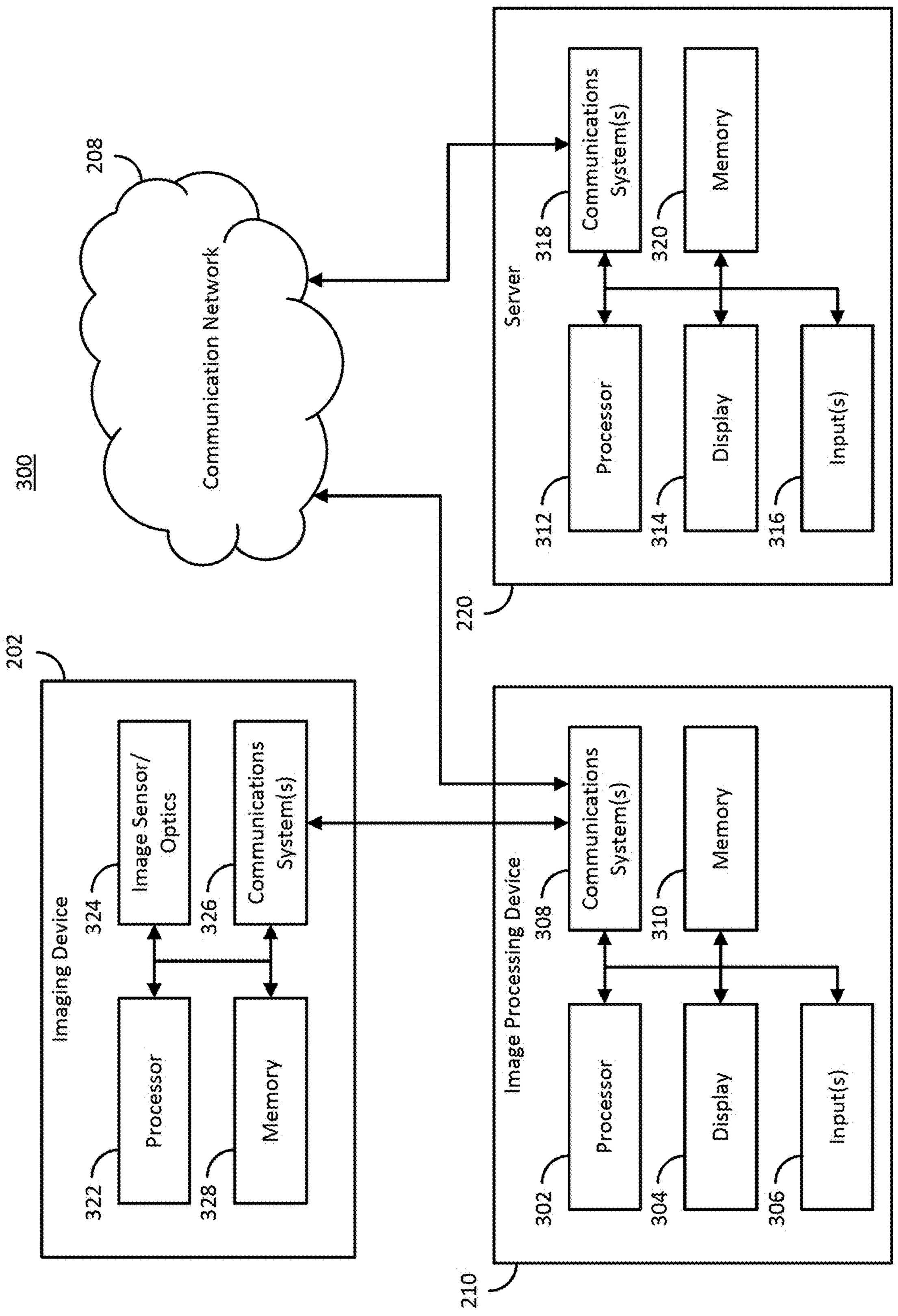
FIG. 3 shows an example of hardware that can be used to implement an image processing device, a server, and an imaging device shown in FIG. 2 in accordance with some embodiments of the disclosed subject matter.

FIG. 3 shows an example 300 of hardware that can be used to implement an image processing device, a server, and an imaging device shown in FIG. 2 in accordance with some embodiments of the disclosed subject matter. FIG. 3 shows an example 300 of hardware that can be used to implement image processing device 210, server 220, and/or imaging device 202 in accordance with some embodiments of the disclosed subject matter. As shown in FIG. 3, in some embodiments, image processing device 210 can include a processor 302, a display 304, one or more inputs 306, one or more communication systems 308, and/or memory 310. In some embodiments, processor 302 can be any suitable hardware processor or combination of processors, such as a central processing unit (CPU), a graphics processing unit (GPU), an application specific integrated circuit (ASIC), a field-programmable gate array (FPGA), etc. In some embodiments, display 304 can include any suitable display devices, such as a computer monitor, a touchscreen, a television, etc. In some embodiments, display 304 can be omitted. In some embodiments, inputs 306 can include any suitable input devices and/or sensors that can be used to receive user input, such as a keyboard, a mouse, a touchscreen, a microphone, etc. In some embodiments, inputs 306 can be omitted.

In some embodiments, communications systems 308 can include any suitable hardware, firmware, and/or software for communicating information over communication network 208 and/or any other suitable communication networks. For example, communications systems 308 can include one or more transceivers, one or more communication chips and/or chip sets, etc. In a more particular example, communications systems 308 can include hardware, firmware and/or software that can be used to establish a Wi-Fi connection, a Bluetooth connection, a cellular connection, an Ethernet connection, etc.

In some embodiments, memory 310 can include any suitable storage device or devices that can be used to store instructions, values, etc., that can be used, for example, by processor 302 to perform a computer vision task, to present content using display 304, to communicate with server 220 and/or imaging device 202 via communications system(s) 308, etc. Memory 310 can include any suitable volatile memory, non-volatile memory, storage, or any suitable combination thereof. For example, memory 310 can include random access memory (RAM), read-only memory (ROM), electronically-erasable programmable read-only memory (EEPROM), one or more flash drives, one or more hard disks, one or more solid state drives, one or more optical drives, etc. In some embodiments, memory 310 can have encoded thereon a computer program for controlling operation of image processing device 210. For example, in such embodiments, processor 302 can execute at least a portion of the computer program to generate composite images depicting surfaces of an object, to transmit image data to server 120, to decode one or more symbols, etc. As another example, processor 302 can execute at least a portion of the computer program to implement image stitching system 204 and/or symbol decoding system 206. As yet another example, processor 302 can execute at least a portion of process(es) 700, 1000, 1100, and/or 1300 described below in connection with FIGS. 7, 10, 11, and/or 13.

In some embodiments, server 220 can include a processor 312, a display 314, one or more inputs 316, one or more communications systems 318, and/or memory 320. In some embodiments, processor 312 can be any suitable hardware processor or combination of processors, such as a CPU, a GPU, an ASIC, an FPGA, etc. In some embodiments, display 314 can include any suitable display devices, such as a computer monitor, a touchscreen, a television, etc. In some embodiments, display 314 can be omitted. In some embodiments, inputs 316 can include any suitable input devices and/or sensors that can be used to receive user input, such as a keyboard, a mouse, a touchscreen, a microphone, etc. In some embodiments, inputs 316 can be omitted.

In some embodiments, communications systems 318 can include any suitable hardware, firmware, and/or software for communicating information over communication network 208 and/or any other suitable communication networks. For example, communications systems 318 can include one or more transceivers, one or more communication chips and/or chip sets, etc. In a more particular example, communications systems 318 can include hardware, firmware and/or software that can be used to establish a Wi-Fi connection, a Bluetooth connection, a cellular connection, an Ethernet connection, etc.

In some embodiments, memory 320 can include any suitable storage device or devices that can be used to store instructions, values, etc., that can be used, for example, by processor 312 to present content using display 314, to communicate with one or more image processing devices 210, etc. Memory 320 can include any suitable volatile memory, non-volatile memory, storage, or any suitable combination thereof. For example, memory 320 can include RAM, ROM, EEPROM, one or more flash drives, one or more hard disks, one or more solid state drives, one or more optical drives, etc. In some embodiments, memory 320 can have encoded thereon a server program for controlling operation of server 220. For example, in such embodiments, processor 312 can receive data from image processing device 210 (e.g., composite images of objects, values decoded from a symbol associated with an object, etc.), image devices 202, and/or dimension sensing system 212, store composite images in connection with identifying information of an object depicted in the composite images, generate a model of an object, cause an archived composite image and/or a model to be presented (e.g., by a remote computing device). As another example, processor 312 can execute at least a portion of the computer program to implement image archival system 224 and/or model rendering system 226. As yet another example, processor 312 can execute at least a portion of process 700 1000, 1100, and/or 1300 described below in connection with FIGS. 7, 10, 11, and/or 13. Note that, although not shown in FIG. 3, server 220 can implement image stitching system 204 and/or symbol decoding system 206 in addition to, or in lieu of, such systems being implemented using image processing device 210.

Figure 4:
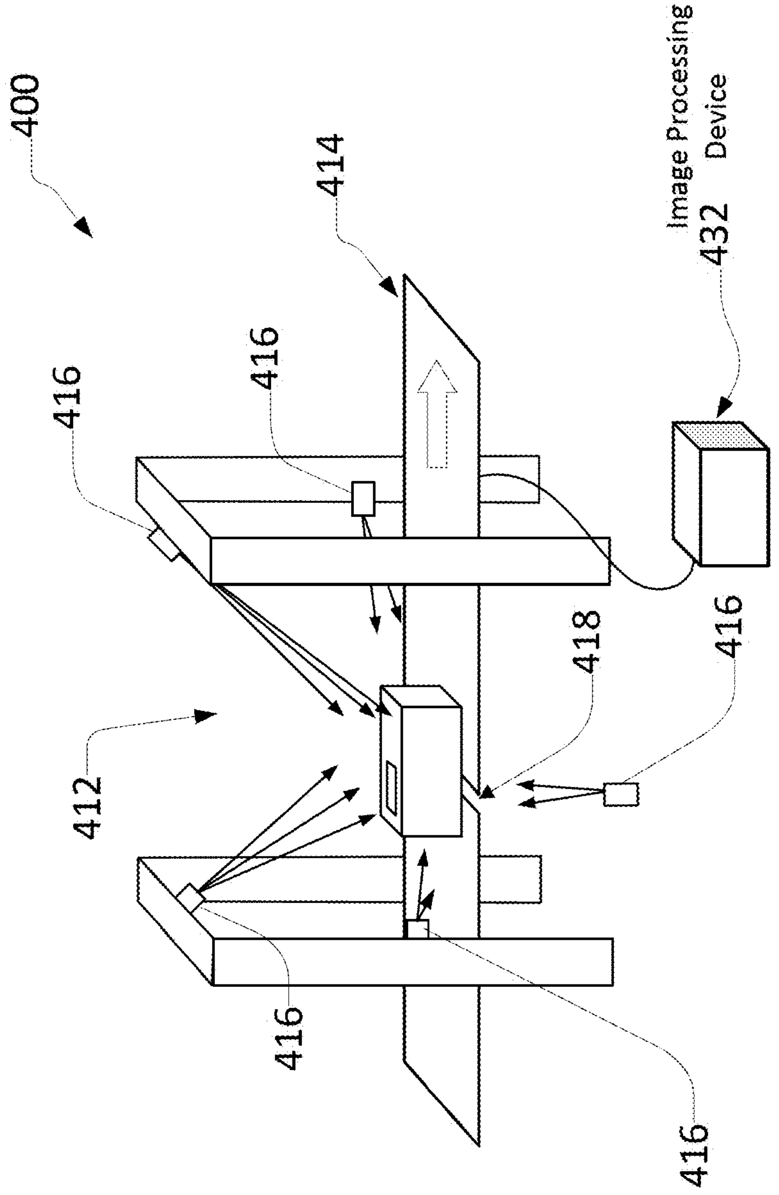
FIG. 4 shows another example of a system for capturing multiple images of each side of an object and generating images of multiple sides of the object in accordance with some embodiments of the disclosed subject matter.

FIG. 4 shows another example 400 of a system for capturing multiple images of each side of an object and generating images of multiple sides of the object in accordance with some embodiments of the disclosed subject matter. In some embodiments, multiple imaging devices and/or steerable mirrors can be used to acquire images of multiple sides of an object traversing a calibrated tunnel (e.g., associated with a conveyor system) in which images are to be acquired of five or more sides of an object as the object passes through a particular area (e.g., along a particular length of a conveyor). For example, imaging system 400 can implement a tunnel 412 along a conveyor 414 and can include multiple imaging devices 416, at least some (e.g., each) of which include a controllable mirror (not shown). Accordingly, via appropriate control of the mirrors, imaging devices 416 can be used to acquire images over a full span of desired FOVs, in lieu of image acquisition with a much larger number of conventional imaging devices (e.g., as described below in connection with FIG. 6). For example, in FIG. 4, five imaging devices 416 can be used to replace fourteen (or more) imaging devices in conventional arrangements for imaging of five or six exposed sides of an object passing through the tunnel 412. For example, a gap 418 in conveyor 414 can facilitate imaging of a bottom side of an object (e.g., as described in U.S. Patent Application Publication No. 2019/0333259, filed on Apr. 25, 2018, which is hereby incorporated herein by reference in its entirety). Note that although some embodiments are described herein in connection with a conveyor type transport system (e.g., conveyor belts, conveyor rollers, etc.), embodiments described herein can be implemented with other types of transport systems. For example, a transport system can utilize one or more autonomous vehicles (e.g., configured to transport an object from one place to another), one or more robotic arms (e.g., a robot bin picker) configured to move an object from one place to another, etc.

In some embodiments, a different number of imaging devices for use with controllable mirrors can be used, or can be used in place of a different number of conventional imaging devices. For example, as few as one imaging device 416 (e.g., as described below in connection with FIG. 5) can be arranged so that steerable mirrors and/or fixed mirrors associated with imaging devices 416 can be manipulated in order to capture images of all exposed sides of an object as the object moves through tunnel 412. In such an example, a third imaging device 416 can be configured to capture images of an otherwise unexposed surface (e.g., a bottom surface, a surface facing conveyor 414). In a particular example, imaging devices 416 can be supported at a top of a support structure(s) of tunnel 412 on opposing lateral and front-to-back sides of tunnel 412.

In some embodiments, an image processing device 432 can coordinate operations of imaging devices 416 and/or can perform image processing tasks, as described above in connection with image processing device 132 of FIG. 1A and/or image processing device 210 of FIG. 2. For example, image processing device 432 can generate composite images of one or more sides of an object moving through tunnel 412. Additionally, in some embodiments, a dimensioning system (not shown) can measure dimensions of objects moving toward tunnel 412 on conveyor 414, and such dimensions can be used (e.g., by image processing device 432) to generate composite images of an object moving through tunnel 412.

Figure 5:
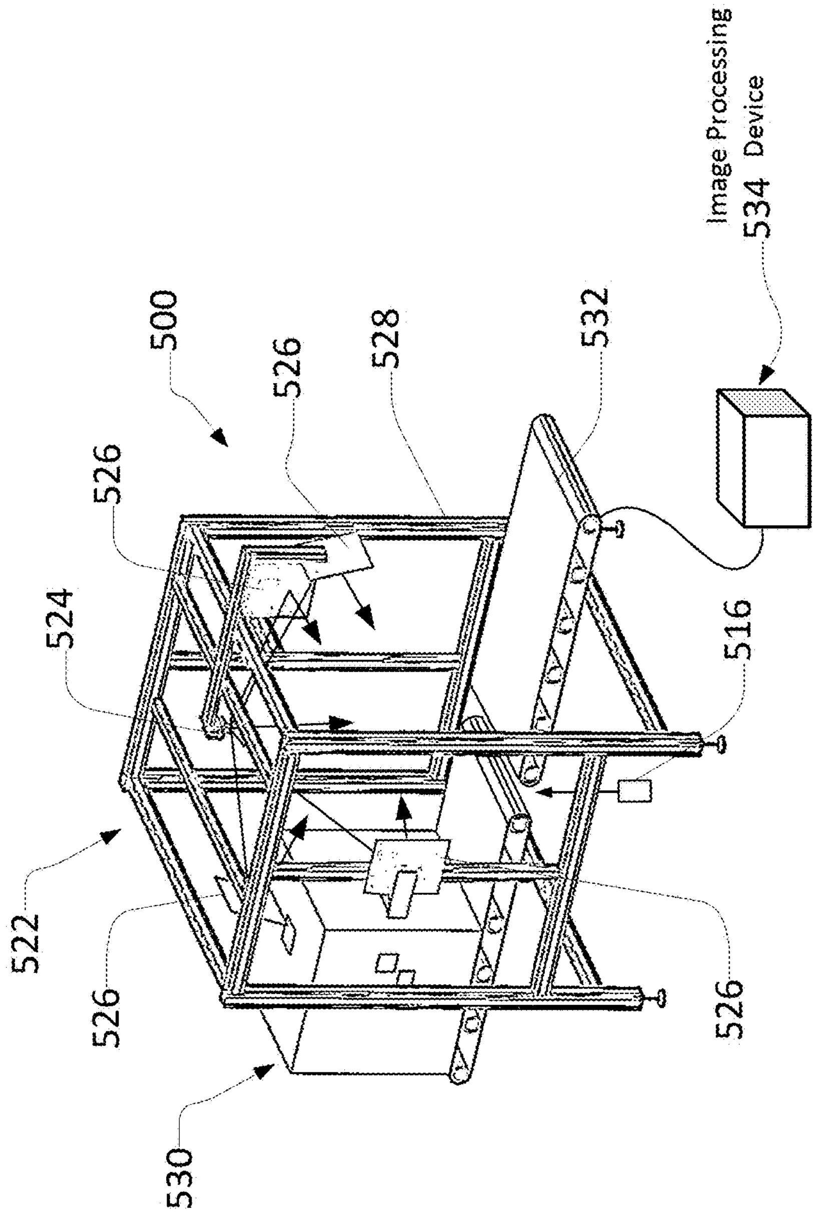
FIG. 5 shows yet another example of a system for capturing multiple images of each side of an object and generating images of multiple sides of the object in accordance with some embodiments of the disclosed subject matter.

FIG. 5 shows yet another example 500 of a system for capturing multiple images of each side of an object and generating images of multiple sides of the object in accordance with some embodiments of the disclosed subject matter. In some embodiments, a combination of controllable and fixed mirrors can be used to acquire images of multiple sides of an object, including in tunnel applications. For example, as shown in FIG. 5, system 500 associated with a tunnel 522 can include a single imaging device 524 with a controllable mirror, such as an imaging device configured similarly to imaging device 40 described in connection with FIG. 2 of U.S. patent application Ser. No. 17/071,636. Additionally, tunnel 522 can include multiple fixed mirrors 526 supported on different sides of a support structure 528 for the tunnel 522. With this arrangement and other similar arrangements (e.g., with different numbers or configurations of imaging devices or fixed mirrors), the controllable mirror can be moved to allow successive acquisition of images, via different reflections off of the fixed mirrors 526, of five visible sides of an object 530 as a conveyor 532 moves object 530 through tunnel 522. For example, as the object 530 moves through tunnel 522, images can be successively acquired, using different instances of the mirrors 526, of a front, top, left, right, and back side of object 530. In some embodiments, a gap in conveyor 532 can facilitate imaging of a bottom side of an object (e.g., as described in U.S. Patent Application Publication No. 2019/0333259, filed on Apr. 25, 2018) using an imaging device 516 (e.g., implemented similarly to imaging devices 416 described above in connection with FIG. 4).

In some embodiments, an image processing device 534 can coordinate operations of imaging devices 524 and/or 516 and/or can perform image processing tasks, as described above in connection with image processing device 132 of FIG. 1A and/or image processing device 210 of FIG. 2. For example, image processing device 534 can generate composite images of one or more sides of an object moving through tunnel 522. Additionally, in some embodiments, a dimensioning system (not shown) can measure dimensions of objects moving toward tunnel 522 on conveyor 532, and such dimensions can be used (e.g., by image processing device 534) to generate composite images of an object moving through tunnel 522.

Figure 6:
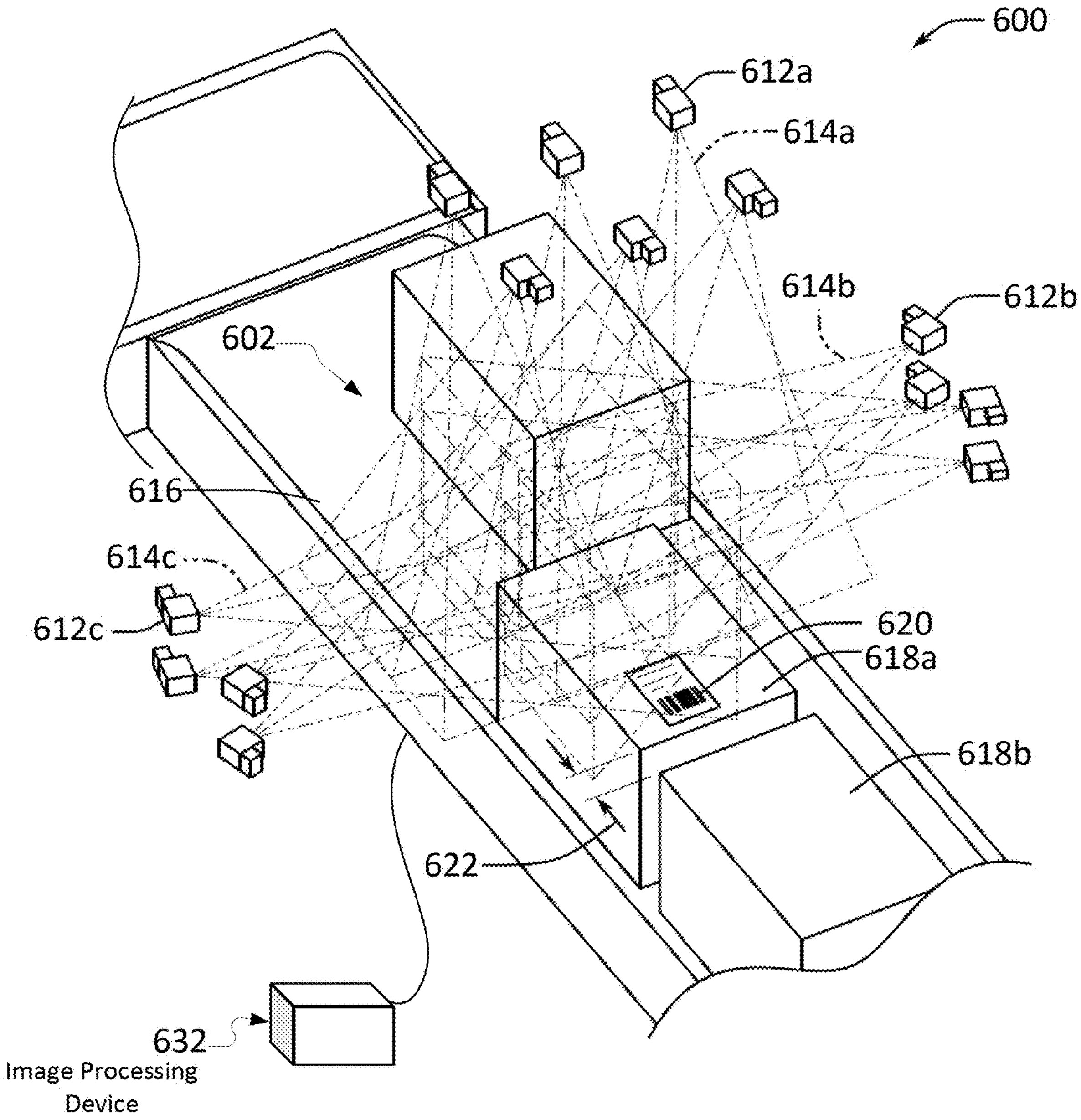
FIG. 6 shows still another example of a system for capturing multiple images of each side of an object and generating images of multiple sides of the object in accordance with some embodiments of the disclosed subject matter.

FIG. 6 shows still another example 600 of a system for capturing multiple images of each side of an object and generating images of multiple sides of the object in accordance with some embodiments of the disclosed subject matter. In some embodiments, system 600 can be configured to generate composite images of objects (e.g., objects 618*a*, 618*b*) moving through a tunnel 602 and/or configured to evaluate symbols on objects (e.g., objects 618*a*, 618*b*), such as a symbol 620 on object 618*a*. In some embodiments, symbol 620 is a flat 2D barcode on a top surface of object 618*a*, and objects 618*a* and 618*b* are roughly cuboid boxes. Additionally or alternatively, in some embodiments, any suitable geometries are possible for an object to be imaged, and any variety of symbols and symbol locations can be imaged and evaluated, including non-direct part mark (DPM) symbols and DPM symbols located on a top or any other side of an object.

In FIG. 6, objects 618*a* and 618*b* are disposed on a conveyor 616 that is configured to move objects 618*a* and 618*b* in a horizontal direction through tunnel 602 (e.g., at a relatively predictable and continuous rate, or at a variable rate measured by a device, such as a motion measurement device). Additionally or alternatively, objects can be moved through tunnel 602 in other ways (e.g., with non-linear movement).

In some embodiments, system 600 can include imaging devices 612 and an image processing device 632. For example, system 600 can includes multiple imaging devices in a tunnel arrangement (e.g., implementing a portion of tunnel 602), representatively shown via imaging devices 612*a*, 612*b*, and 612*c*, each with a field-of-view ("FOV"), representatively shown via FOV 614*a*, 614*b*, 614*c*, that includes part of the conveyor 616. In some embodiments, each imaging device 612 can be positioned at an angle relative to the conveyor top or side (e.g., at an angle relative to a normal direction of symbols on the sides of the objects 618*a* and 618*b* or relative to the direction of travel), resulting in an angled FOV. Similarly, some of the FOVs can overlap with other FOVs (e.g., FOV 614*a* and FOV 614*b*). In such embodiments, system 600 can be configured to capture one or more images of multiple sides of objects 618*a* and/or 618*b* as the objects are moved by conveyor 616. As described above, the captured images can be used to generate composite images of each side of the object and/or to identify symbols (e.g., a symbol 620), which can be subsequently decoded (as appropriate). In some embodiments, a gap in conveyor 616 (not shown) can facilitate imaging of a bottom side of an object (e.g., as described in U.S. Patent Application Publication No. 2019/0333259, filed on Apr. 25, 2018) using an imaging device or array of imaging devices (not shown, disposed below conveyor 616). Note that although two arrays of three imaging devices 612 are shown imaging a top of objects 618*a* and 618*b*, and four arrays of two imaging devices 612 are shown imaging sides of objects 618*a* and 618*b*, this is merely an example, and any suitable number of imaging devices can be used to capture images of various sides of objects. For example, each array can include four or more imaging devices. Additionally, although imaging devices 612 are generally shown imaging objects 618*a* and 618*b* without mirrors to redirect a FOV, this is merely an example, and one or more fixed and/or steerable mirrors can be used to redirect a FOV of one or more of the imaging devices, which may facilitate a reduced distance vertical or lateral distance between imaging devices and objects in tunnel 602. For example, imaging device 612*a* can be disposed with an optical axis parallel to conveyor 616, and one or more mirrors can be disposed above tunnel 602 to redirect a FOV from imaging devices 612*a* toward a front and top of objects in tunnel 602.

In some embodiments, imaging devices 612 can be implemented using any suitable type of imaging device(s). For example, imaging devices 612 can be implemented using 2D imaging devices (e.g., 2D cameras), such as area scan cameras and/or line scan cameras. In some embodiments, imaging device 612 can be an integrated system that includes a lens assembly and an imager, such as a CCD or CMOS sensor.

In some embodiments, image processing device 632 can coordinate operations of imaging devices 612 and/or can perform image processing tasks, as described above in connection with image processing device 132 of FIG. 1A and/or image processing device 210 of FIG. 2. For example, image processing device 632 can generate composite images of one or more sides of an object moving through tunnel 602. Additionally, in some embodiments, a dimensioning system (not shown) can measure dimensions of objects moving toward tunnel 602 on conveyor 616, and such dimensions can be used (e.g., by image processing device 632) to generate composite images of an object moving through tunnel 602.

Figure 7:
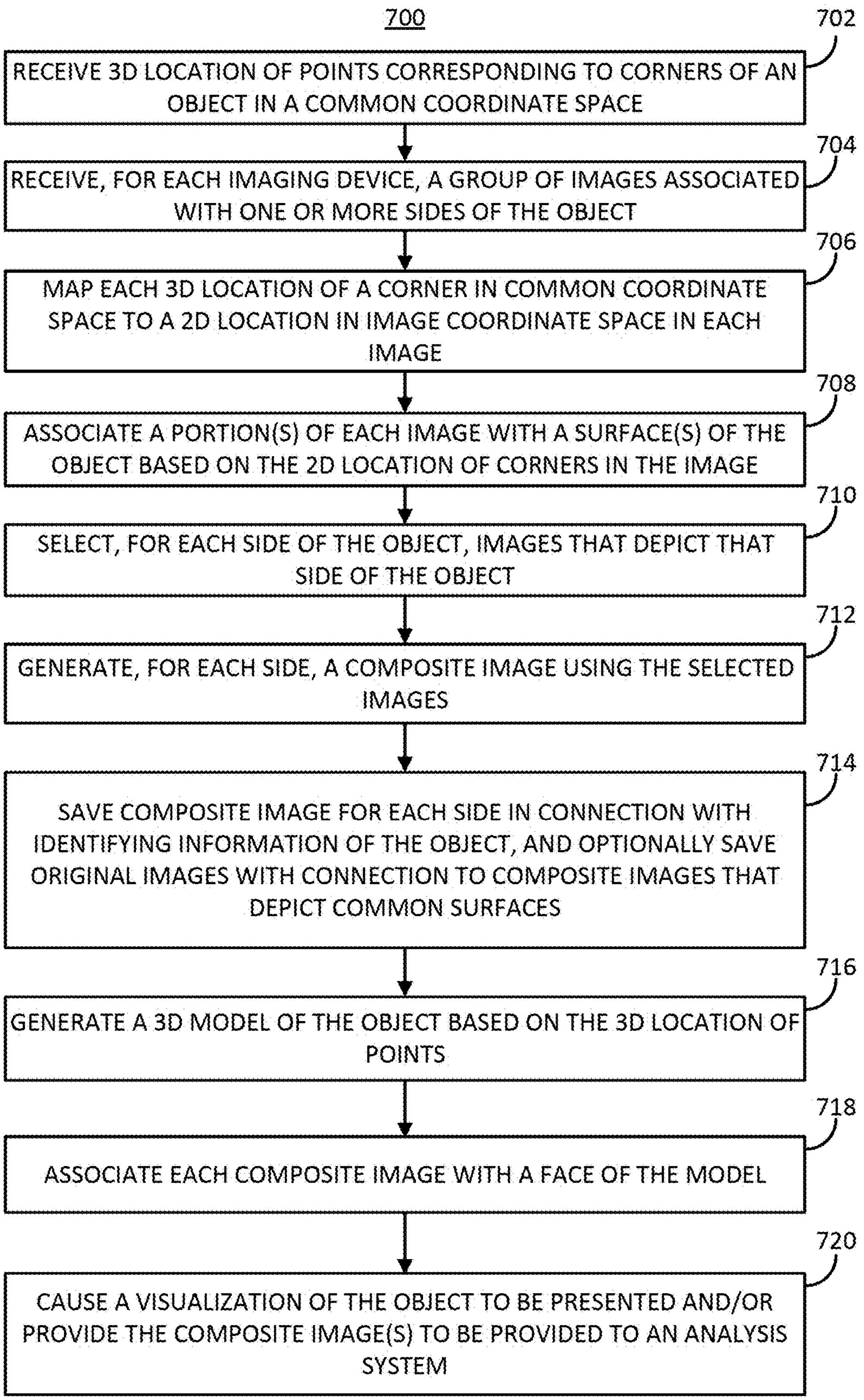
FIG. 7 shows an example of a process for generating images of multiple sides of an object using multiple images of each side of the object in accordance with some embodiments of the disclosed subject matter.

FIG. 7 shows an example 700 of a process for generating images of multiple sides of an object using multiple images of each side of the object in accordance with some embodiments of the disclosed subject matter.

At 702, process 700 can receive 3D locations of points corresponding to corners of an object in tunnel coordinate space associated with a device used to determine the 3D locations and/or defined based on a physical space (e.g., a support structure and/or support platform 116 of FIG. 1A, a conveyor, such as conveyor 414, 532, or 616). For example, as described above in connection with FIG. 1, a dimensioner (e.g., dimensioner 130) can determine a location of the corners of an object at a particular point in time and/or when the object is located at a particular location (e.g., a location associated with the dimensioner). As another example, a dimensioner (e.g., dimensioner 130) can generate data indicative of a 3D pose of an object, and can provide the data (e.g., point cloud data, a height of the object, a width of the object, etc.) to process 700, which can determine the 3D locations of one or more points of the object.

In some embodiments, the 3D locations can be locations in a coordinate space associated with a device that measured the 3D locations. For example, as described above in connection with FIG. 1A, the 3D locations can be defined in a coordinate space associated with the dimensioner (e.g., in which the origin is located at the dimensioner). As another example, as described above in connection with FIG. 1A, the 3D locations can be defined in a coordinate space associated with a static support structure (e.g., a support structure, support platform 116). As yet another example, the 3D locations can be defined in a coordinate space associated with a dynamic support structure (e.g., a conveyor, such as conveyor 414, 532, or 616). In such an example, the 3D locations measured by the dimensioner can be associated with a particular time at which a measurement was taken, and/or a particular location along the dynamic support structure. In some embodiments, a 3D location of the corners of the object when an image of the object was captured can be derived based on the initial 3D locations and a time that has elapsed since the measurement was taken and a speed of the object during the elapsed time. Additionally or alternatively, a 3D location of the corners of the object when an image of the object was captured can be derived based on the initial 3D locations and distance that the object has traveled since the measurement was taken (e.g., recorded using a motion measurement device that directly measures movement of the conveyor). In some embodiments, the 3D locations of points corresponding to corners of the object can be information indicative of a 3D pose of the object. For example, the 3D positioning of the object in a coordinate space can be determined based on the 3D locations of points in that coordinate space corresponding to corners of the object.

In some embodiments, process 700 can receive raw data indicative of a 3D pose of the object (e.g., point cloud data, a height of the object, a width of the object, etc.), and can determine the 3D pose of the object and/or the location of one or more features (e.g., corners, edges, surfaces, etc.) of the object using the raw data. For example, process 700 can utilize techniques described in U.S. Pat. No. 11,335,021, issued May 17, 2022, which is hereby incorporated herein by reference in its entirety, to determine the 3D pose of the object (e.g., for cuboidal objects, polybags, envelopes, jiffy mailers, and objects that can be approximated as cuboidal) and/or the location of one or more features of the object from raw data indicative of the 3D pose of the object. As another example, process 700 can utilize techniques described in U.S. Patent Application Publication No. 2022/0148153, published May 12, 2022, which is hereby incorporated herein by reference in its entirety, to determine the 3D pose of the object (e.g., for cylindrical and spherical objects)

and/or the location of one or more features of the object from raw data indicative of the 3D pose of the object.

In some embodiments, a portion of process 700 (e.g., 702) can be executed by an imaging device (e.g., a particular imaging device 202), which can receive location and/or pose information, and can use the information to determine which images to capture and/or which images to transmit to another device (e.g., imaging processing device 132). In such embodiments, dimensioner 130 may omit determining locations of points corresponding to corners.

At 704, process 700 can receive, for each of one or more imaging devices, a group of images associated with one or more sides of the object. For example, the group of images can be images captured by a single imaging device with different FOVs (e.g., a FOV redirected via a steerable mirror or otherwise moveable mirror) and/or as the object moved past the imaging device as described above in connection with FIGS. 1A, 4, and 5. As another example, the group of images can be images captured by an array of imaging devices as an object moved past the array of imaging devices (e.g., by a conveyor) as described above in connection with FIG. 6.

In some embodiments, a computing device executing process 700 (e.g., imaging processing device 202) can use information indicative of a 3D pose (e.g., the locations of corners of the object, point cloud data, etc.) of an object to determine times at which each imaging device is to capture images based on the 3D pose information. For example, the computing device can determine a point(s) in time when an object is expected to be within a field of view of each imaging device, and can instruct the imaging devices to capture images at times when the object is within the field of view, and can refrain from instructing imaging devices to capture images when the object (e.g., and any other object other than background) is not within the field of view of that imaging device. In such embodiments, images received by process 700 at 704 can be expected to all include at least one surface of the object.

In some embodiments, an imaging device (e.g., a particular imaging device 202) can receive information indicative of a 3D pose (e.g., the locations of corners of the object, point cloud data, etc.), and can use the information indicative of a 3D pose to determine whether to capture an image at a particular time and/or the which image(s) to transmit to an imaging processing device (e.g., image processing device 210). For example, an imaging device can receive 3D pose information, and can determine at which times a surface of the object is expected to be within the imaging devices field of view based on the 3D pose information. In such an example, the imaging device can capture images at times when the object is within the field of view, and can refrain from capturing images when the object (e.g., and any other object other than background) is not within the field of view. As another example, an imaging device can capture images periodically (e.g., at regular intervals, in response to a trigger signal), and can determine which images are expected to include a surface of the object based on the 3D pose information. In such an example, the imaging device can transmit (e.g., to an image processing device 132) images that are expected to include a surface of the object to the image processing device. In such embodiments, images received by process 700 at 704 can be expected to all include at least one surface of the object.

In some embodiments, a computing device and/or imaging device executing at least a portion of process 700 can capture and/or select images for transmission that correspond to a minimum set of images that can be used to cover a surface of the object (e.g., as described below in connection with process 1000 of FIG. 10). In such embodiments, images received by process 700 at 704 can be fewer images than were captured by the imaging device.

At 706, process 700 can map each 3D location of a corner of the object in the common 3D coordinate space to a 2D location in image coordinate space for each camera (and/or FOV angle) in each image. For example, as described below in connection with FIGS. 8A to 9B, the 3D location of each corner can be mapped to a 2D location in an image captured by an imaging device with a particular FOV at a particular time. Note that in many images each corner may fall outside of the image (e.g., as shown in set of images 140), and in other images one or more corners may fall outside of the image, while one or more corners fall within the image.

At 708, process 700 can associate a portion of each image with a surface of the object based on the 2D location of the corners with respect to the image (e.g., without analyzing the image content). For example, process 700 can identify a portion of a particular image as corresponding to a first side of an object (e.g., a top of the object), and another portion of the particular image as corresponding to a second side of the object (e.g., a front of the object). In some embodiments, process 700 can use any suitable technique or combination of techniques to identify which portion (e.g., which pixels) of an image correspond to a particular side of an object. For example, process 700 can draw lines (e.g., polylines) between the 2D locations associated with corners of object, and can group pixels that fall within the confines of the lines (e.g., polylines) associated with a particular side with that side of the object.

At 710, process 700 can select, for each side of the object, images that depict that side of the object and can be used to generate a composite image of that side. In some embodiments, process 700 can select a set of images for each side that can be used to generate an image of that side using relatively few images (e.g., as described below in connection with process 1000 of FIG. 10). Additionally or alternatively, in some embodiments, process 700 can select a set of images for a side (e.g., each side) that can be used to generate a super-resolution composite image (e.g., in which at least a portion of the image has a higher resolution than images used to generate the composite image) using images with overlapping FOVs. For example, partially overlapping images captured by different cameras and/or by the same camera with a different FOV can result in oversampling of the portions of the object corresponding to the overlapping regions. This oversampling can be leveraged to generate image data with higher resolution.

In some embodiments, process 700 can select a grid of images (e.g., rather than selecting minimal set of images) that depict overlapping and/or adjacent portions of the object. In some embodiments, alignment can be simplified using a grid of images by potentially reducing the number of images to analyze when performing an alignment procedure. For example, process 700 can perform an alignment (e.g., at 712) for each image and a subset of adjacent images. In such an example, process 700 can align images in the grid to an image in one (e.g., of potentially two with a two dimensional array of an image) adjacent row, and in one adjacent column (e.g., of potentially two with a two dimensional array of an image). In a more particular example, process 700 can align images with an image one column to the left (e.g., with a lower column index) and one row above (e.g., with a lower row index). An image in the upper left corner may not be aligned to any other images (although two other images can align to that image), and images in the left column and top row may only be aligned to one other image (although two other images can align to those images).

In some embodiments, 710 can be omitted and/or can be used to remove redundant images. For example, if images received from imaging devices at 704 include only images that include at least a portion of the object, process 700 can omit 700.

At 712, process 700 can generate, for each side, a composite image using the images selected at 710. In some embodiments, process 700 can use any suitable technique or combination of techniques to generate the composite images of each side (e.g., as described below in connection with process 1100 of FIG. 11). For example, process 700 can selectively add a portion of an image corresponding to a particular side after warping the portion of the image to remove distortion (e.g., distortion caused by perspective) based on the 2D location of the portion of the image with respect to that particular side (e.g., without analyzing the content of the portion of the image). In such an example, process 700 can add portions of each selected image until the entire side of the object is included in the composite image. As another example, process 700 can refine an alignment between portions of different images using any suitable technique, such as techniques based on analyzing the content of the image. In such an example, the 2D location of the portions of the images can be used to approximately align the image portions, and another technique (e.g., a more computationally intensive technique) can be used to perform a fine alignment adjustment.

At 714, process 700 can save the composite image for each side of the object in connection with identifying information of the object to facilitate retrieval of the composite images at a later time. For example, process 700 can transmit the composite images to a server, which can store the composite images in a database in connection with identifying information of the object (e.g., a tracking number, a box number, etc.). As another example, process 700 can save the composite images to a local memory (e.g., memory 310).

In some embodiments, at 714, process 700 can save images used to generate a composite image in connection with the composite image depicting a surface of the object included in each image. For example, an image that includes a portion of the top, front, and left sides of an object can be associated with composite images of the top, front, and left sides of the object. In some embodiments, a graphical user interface can be configured to present a composite image in which one or more portions of the image are selectable. Upon selection of an area of the composite image, saved images that include that portion of the composite image can be presented in response to the selection. In some embodiments, each pixel location can be hyperlinked to all images that include that portion of the object. Additionally or alternatively, in some embodiments, the graphical user interface can be configured to present outlines overlaid on the composite image that each represent a portion of an image that corresponds to the side of the object associated with the composite image. In some embodiments, the outline of only those images used to generate the composite image can be presented. Additionally or alternatively, in some embodiments, the outline of all images having a portion corresponding to the side associated with the composite image can be presented regardless of whether that image was used to generate the composite image (e.g., user input can be provided to indicate which outlines to present).

In some embodiments, the saved composite images can be retrieved for various applications. For example, the saved composite images can be retrieved and presented if the item is reported as damaged to determine whether the damage occurred before or after the object was imaged. As another example, the saved composite images can be retrieved and presented if a symbol could not be found on the object and/or a symbol could not be decoded. In such an example, the composite images can be used (e.g., by an automated system without user intervention) to try to locate and/or decode a symbol. In such examples, the original images (e.g., images that include a position of a side associated with a composite image) can be linked to the composite image. Additionally or alternatively, the composite images can be used (e.g., by an automated system without user intervention) to generate supplemental information that can be used to identify the object, such as an addressee of a package, an address to which a package is to be shipped, a tracking number printed in text on a shipping label, etc.

At 716, process 700 can generate a 3D model of the object based on the 3D location of points received at 702. For example, process 700 can determine a shape of the object based on the 3D location of the corners of the object, and process 700 can generate a model that has the same dimensions (e.g., the same ratio of dimension) as the object.

At 718, process 700 can associate each composite image of a side of the object with a face of the model. For example, a composite image of a "top" of the object can be associated with a "top" face of the model. In some embodiments, 716 and 718 can be omitted, for example, when a 3D visualization of the object is not presented.

At 720, process 700 can cause a visualization of the object to be presented based on the composite images and/or can provide the composite images to an analysis system. In some embodiments, the visualization can be any suitable visualization, such as a visualization of the 3D model with the composite images associated with each face of the 3D model. As another example, the visualization can be a 2D image, or a collection of 2D images, each presenting a composite image of each face.

Figure 8A:
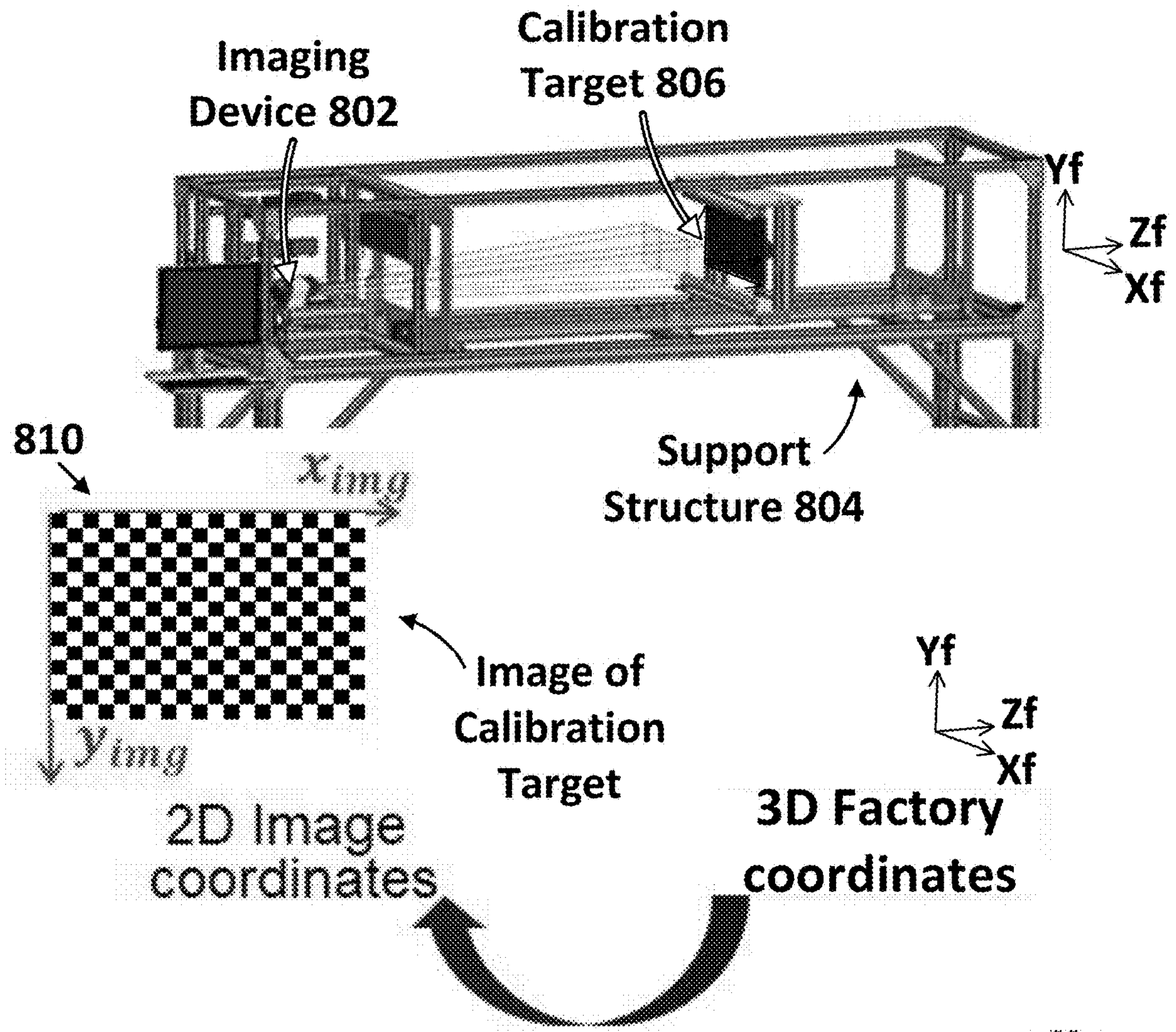
FIG. 8A shows an example of a factory calibration setup that can be used to find a transformation between an image coordinate space and a calibration target coordinate space.

FIG. 8A shows an example of a factory calibration setup that can be used to find a transformation between an image coordinate space and a calibration target coordinate space. As shown in FIG. 8A, an imaging device 802 can generate images (e.g., image 810) that project points in a 3D factory coordinate space (Xf, Yf, Zf) onto a 2D image coordinate space (xi, yi). The 3D factory coordinate space can be defined based on a support structure 804 (which may sometimes be referred to as a fixture) that supports a calibration target 806 used to find the transform between the factory coordinate space and the image coordinate space.

Generally, the overall goal of calibrating imaging device 802 (e.g., a camera) is to find a transformation between a physical 3D coordinate space (e.g., in millimeters) and the image 2D coordinate space (e.g., in pixels). The transformation in FIG. 8A illustrates an example of such a transformation using a simple pinhole camera model. The transformation can have other nonlinear components (e.g., to represent lens distortion). The transformation can be split into extrinsic and intrinsic parameters. The extrinsic parameters can depend on the location and orientation of mounting the imaging device(s) with respect to the physical 3D coordinate space. The intrinsic parameters can depend on internal imaging device parameters (e.g., the sensor and lens parameters). The calibration process goal is to find value(s) for these intrinsic and extrinsic parameters. In some embodiments, the calibration process can be split into two parts: one part executed in the factory calibration and another part executed in the field.

Figure 8B:
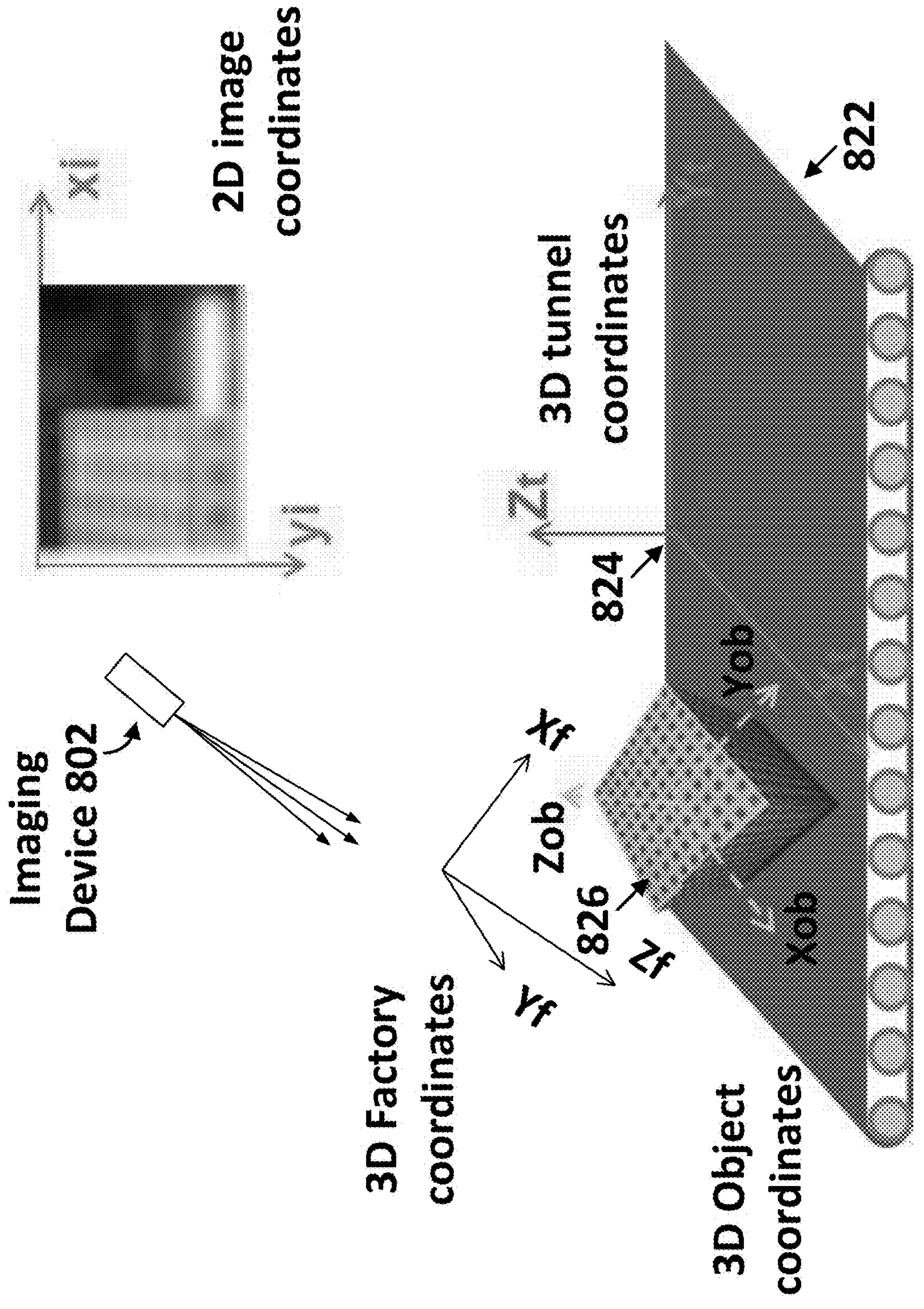
FIG. 8B shows an example of coordinate spaces and other aspects for a calibration process, including a factory calibration and a field calibration that includes capturing images of one or more sides of an object in accordance with some embodiments of the disclosed subject matter.

FIG. 8B shows an example of coordinate spaces and other aspects for a calibration process, including a factory calibration and a field calibration that includes capturing images of one or more sides of an object in accordance with some embodiments of the disclosed subject matter. As shown in 8B, a tunnel 3D coordinate space (e.g., the tunnel 3D coordinate space shown in FIG. 8B with axes Xt, Yt, Zt) can be defined based on a support structure 822. For example, in FIG. 8B, a conveyor is used to define the tunnel coordinate space, with an origin 824 at a particular location along the conveyor (e.g., with Yt=0 defined at a particular point along the conveyor, for example at a point defined based on the location of a photo eye as described in U.S. Patent Application Publication No. 2021/0125373, Xt=0 defined at one side of the conveyor, and Zt=0 defined at the surface of the conveyor). As another example, the tunnel coordinate space can be defined based on a stationary support structure (e.g., as described above in connection with FIG. 1A. Alternatively, in some embodiments, the tunnel coordinate space can be defined based on a dimension used to measure the location of an object.

Additionally, in some embodiments, during a calibration process (e.g., a field calibration process), an object coordinate space (Xob, Yob, Zob) can be defined based on an object (e.g., object 826) being used to perform the calibration. For example, as shown in FIG. 8B, symbols can be placed onto an object (e.g., object 826), where each symbol is associated with a particular location in object coordinate space.

Figure 8C:
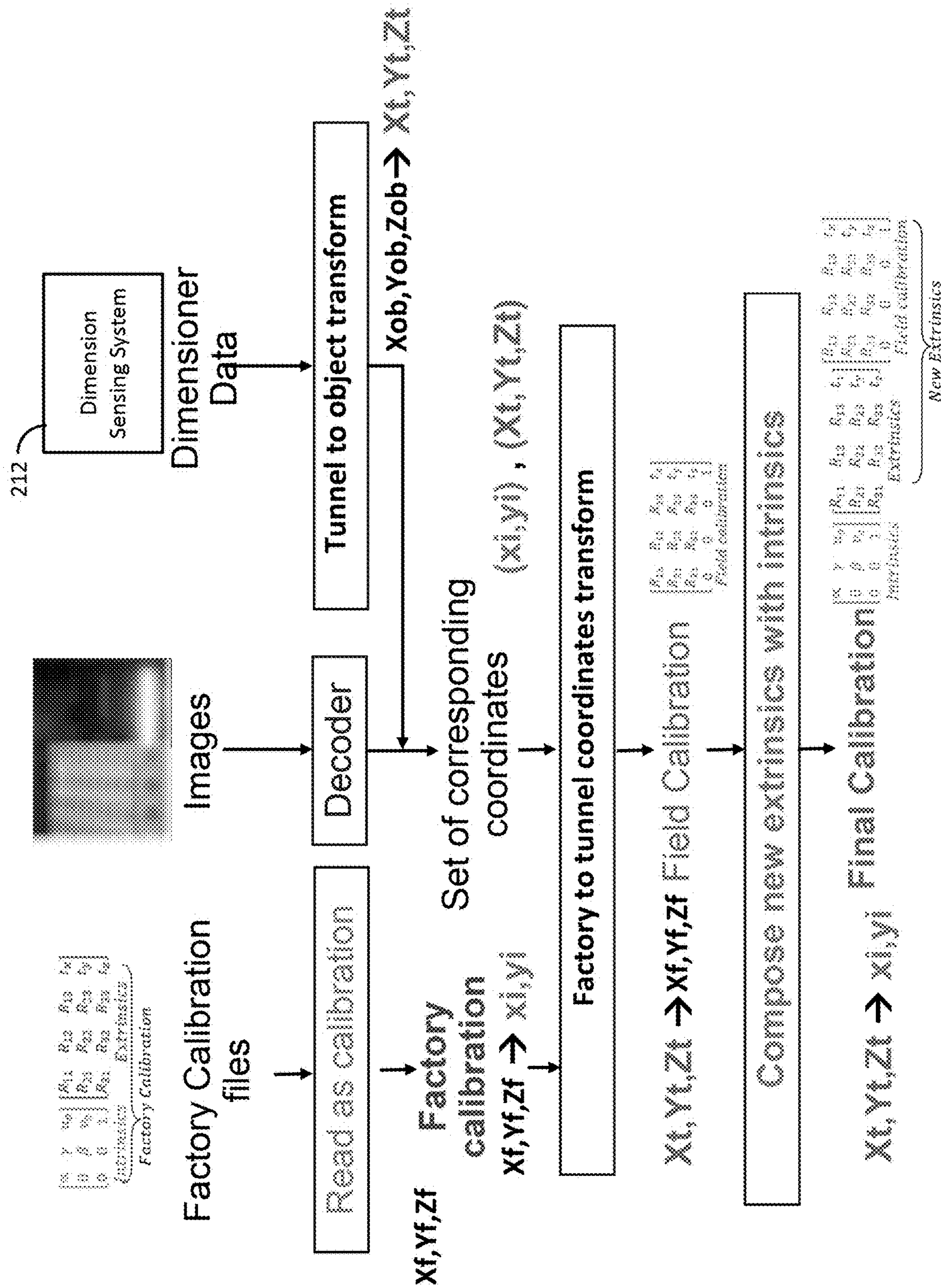
FIG. 8C shows an example of a field calibration process for generating an imaging device model useable to transform coordinates of an object in a 3D coordinate space, including capturing images of one or more sides of the object in accordance with some embodiments of the disclosed subject matter.

FIG. 8C shows an example of a field calibration process for generating an imaging device model useable to transform coordinates of an object in a 3D coordinate space, including capturing images of one or more sides of the object in accordance with some embodiments of the disclosed subject matter. In some embodiments, an imaging device (e.g., imaging device 802) can be calibrated before being installed in the field (e.g., a factory calibration can be performed). Such a calibration can be used to generate an initial camera model that can be used to map points in 3D factory coordinate space to 2D points in the image coordinate space. For example, as shown in FIG. 8C, a factory calibration process can be performed to generate extrinsic parameters that can be used with intrinsic parameters to map points in the 3D factory coordinate space into 2D points in the image coordinate space. The intrinsic parameters can represent parameters that relate pixels of the image sensor of an imaging device to an image plane of the imaging device, such as a focal length, an image sensor format, and a principal point. The extrinsic parameters can represent parameters that relate points in 3D tunnel coordinates (e.g., with an origin defined by a target used during factory calibration) to 3D camera coordinates (e.g., with a camera center defined as an origin).

A dimensioner can measure a calibration object (e.g., a box with codes affixed that define a position of each code in the object coordinate space, such as object 826) in the tunnel coordinate space, and the location in tunnel coordinate space can be correlated with locations in image coordinate space of the calibration object (e.g., relating coordinates in (Xt, Yt, Zt) to (xi, yi)). Such correspondence can be used to update the camera model to account for the transformation between the factory coordinate space and the tunnel coordinate space (e.g., by deriving a field calibration extrinsic parameter matrix, which can be defined using a 3D rigid transformation relating one 3D coordinate space such as the tunnel coordinate space to another, such as the factory coordinate space). The field calibration extrinsic parameter matrix can be used in conjunction with the camera model derived during factory calibration to relate points in the tunnel coordinate space (Xt, Yt, Zt) to points in image coordinate space (xi, yi). This transformation can be used to map 3D points of an object measured by a dimensioner to an image of the object, such that the portions of the image corresponding to a particular surface can be determined without analyzing the content of the image. Note that the model depicted in FIGS. 8A, 8B, and 8C is a simplified (e.g., pinhole camera) model that can be used to correct for distortion caused by projection to avoid overcomplicating the description, and more sophisticated models (e.g., including lens distortion) can be used in connection with mechanisms described herein.

Note that this is merely an example, and other techniques can be used to define a transformation between tunnel coordinate space and image coordinate space. For example, rather than performing a factory calibration and a field calibration, a field calibration can be used to derive a model relating tunnel coordinates to image coordinates. However, this may cause replacement of an imaging device to be more cumbersome, as the entire calibration may need to be performed to use a new imaging device. In some embodiments, calibrating an imaging device using a calibration target to find a transformation between a 3D factory coordinate space and image coordinates, and calibrating the imaging device in the field to find a transformation that facilitates mapping between tunnel coordinates (e.g., associated with a conveyor, a support platform, or a dimensioner) can facilitate replacement of an imaging device without repeating the field calibration (e.g., as described in U.S. Pat. No. 9,305,231, issued Apr. 5, 2016, which is hereby incorporated herein by reference in its entirety).

Figure 9A:
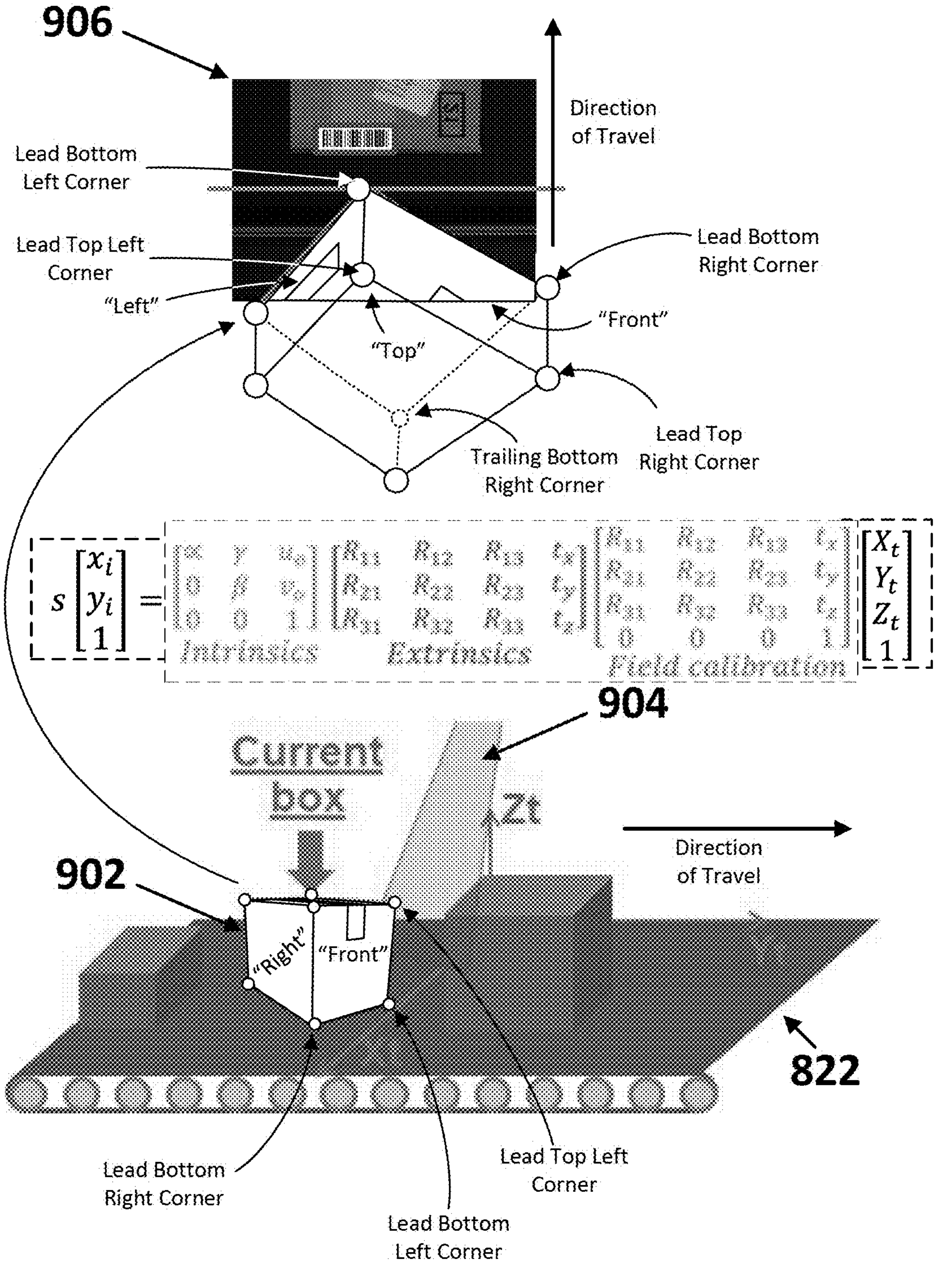
FIG. 9A shows an example of field calibration process associated with different positions of a calibration target (or targets) in accordance with some embodiments of the disclosed subject matter.
Figure 9B:
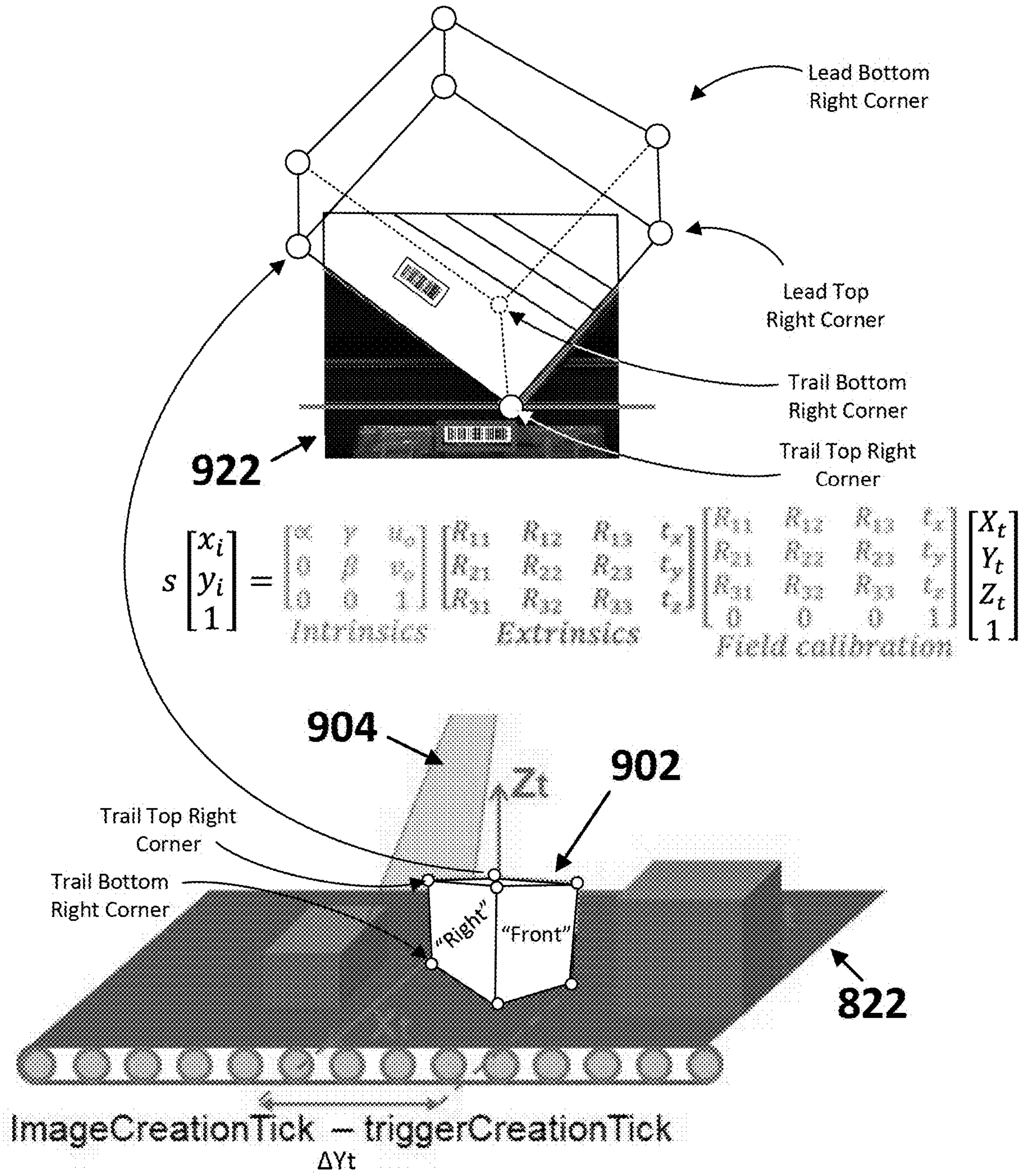
FIG. 9B shows another example of a field calibration process associated with different positions of a calibration target (or targets) in accordance with some embodiments of the disclosed subject matter.

FIGS. 9A and 9B show examples of field calibration processes associated with different positions of a calibration target (or targets) in accordance with some embodiments of the disclosed subject matter in accordance with some embodiments of the disclosed subject matter. As shown in FIG. 9A, mechanisms described herein can map 3D points associated with an object (e.g., the corners of the object) defined in a tunnel coordinate space specified based on geometry of a conveyor (or other transport system and/or support structure) to points in an image coordinate space based on a model generated based on a factory calibration and a field calibration. For example, as shown in FIG. 9A, mechanisms described herein can map 3D points associated with box 902 defined in tunnel coordinates (Xt, Yt, Zt) with respect to support structure 822 to points in an image coordinate space associated with an imaging device (e.g., imaging device 902). In some embodiments, the 2D points of each corner in image space can be used with knowledge of the orientation of the imaging device to associate each pixel in the image with a particular surface (or side) of an object (or determine that a pixel is not associated with the object) without analyzing the content of the image.

For example, as shown in FIG. 9A, the imaging device (e.g., imaging device 802, not shown in FIG. 9A) is configured to capture images (e.g., image 906) from a front-top angle with respect to the tunnel coordinates (e.g., with field of view 904). In such an example, 2D locations of the corners of the box can be used to automatically associate a first portion of the image with a "left" side of the box, a second portion with a "front" side of the box, and a third portion with a "top" side of the box. As shown in FIG. 9A, only two of the corners are located within image 906, with the other 6 corners falling outside the image. Based on the knowledge that the imaging device is configured to capture images from above the object and/or based on camera calibration (e.g., which facilitates a determination of the location of the imaging device and the optical axis of the imaging device with respect to the tunnel coordinates), the system can determine that the leading left bottom corner and leading left top corner are both visible in the image.

As shown in FIG. 9B, in a second image 922 captured after the box moved a distance ΔYt along the conveyor. As described above, a motion measurement device can be used to determine a distance that the box has traveled between when first image 906 shown in FIG. 9A was captured and when second image 922 was captured. Operation of such a motion measurement device (e.g., implemented as an encoder) is described in U.S. Pat. No. 9,305,231, and U.S. Patent Application Publication No. 2021/0125373, filed Oct. 26, 2020, which is hereby incorporated herein by reference in its entirety. The distance traveled and the 3D coordinates can be used to determine the 2D points in second image 922 corresponding to corners of the box. Based on the knowledge that the imaging device is configured to capture images from above the object, the system can determine that the trailing top right corner is visible in image 922, but the trailing bottom right corner is obstructed by the top of the box. Additionally, the top surface of the box is visible but the back and the right surfaces are not visible.

Figure 10:
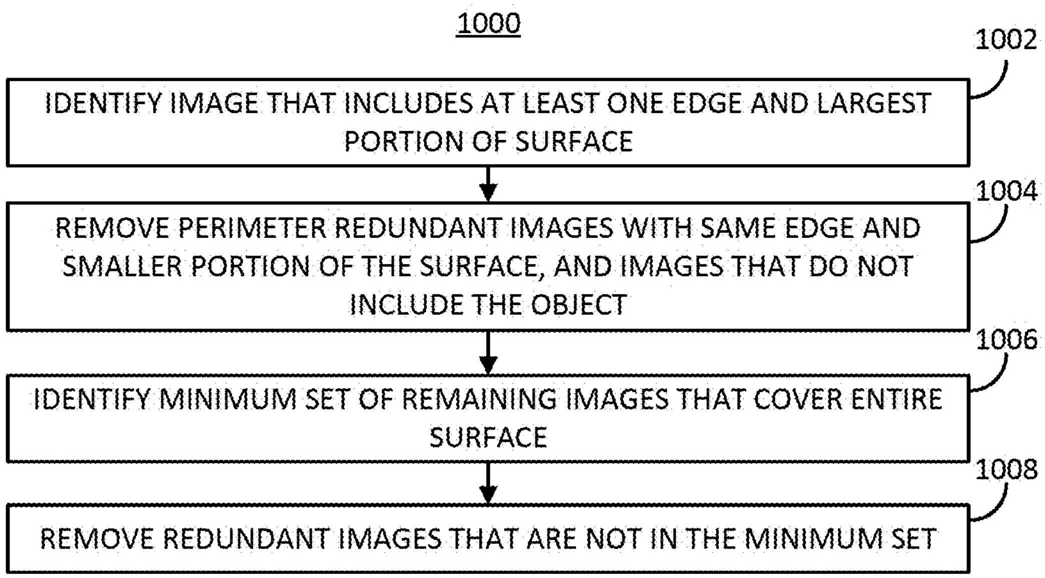
FIG. 10 shows an example of a process for selecting images useable to generate an image of a surface of an object from multiple images of the surface of the object in accordance with some embodiments of the disclosed subject matter.

FIG. 10 shows an example 1000 of a process for selecting images useable to generate an image of a surface of an object from multiple images of the surface of the object in accordance with some embodiments of the disclosed subject matter.

At 1002, process 1000 can identify, for each edge, an image that includes the edge, and that include a largest portion of a surface of all images that include that edge. For example, process 1000 can determine which images include an edge based on the 2D location of the corners of an object in each image. In such an example, process 1000 can draw polylines between adjacent corners, and can determine whether any of the polylines traverses the image. In a particular example, using such a technique, process 1000 can determine that the image in FIG. 9A includes five edges.

As another example, process 1000 can determine how much of a particular surface is included in an image based on a number of pixels in each image that correspond to the surface. For example, as described above in connection with 708 of FIG. 7, process 700 (or any other suitable process) can associate a portion of an image with a particular surface based on the 2D location of each corner of the object in relation to each image.

At 1004, process 1000 can remove perimeter redundant images that include the same edge as an image identified at 1002, but that include a smaller portion of the surface from consideration for selecting into a subset used to generate a composite image of the side. Additionally, at 1004, process 1000 can remove images that do not include any of the surface (if any were initially included) from consideration for selecting into a subset used to generate a composite image of the side.

At 1006, process 1000 can identify a minimum set of remaining images that can be used to cover the entire surface of the side of the object being considered. For example, process 1000 can select an interior image (e.g., that shows only an interior of a surface without edges, or that shows a portion of the interior and a portion of an edge that is not otherwise covered) to use that provides a largest area of the surface that does not overlap with any of the perimeter images selected at 1002. In such an example, process 1000 can determine which of the remaining (e.g., non-selected, not yet removed) images only show portions of the surface that are also present in another image. In some embodiments, process 1000 can determine an extent of overlap between two images using any suitable technique or combination of techniques. For example, process 1000 can find an intersection between the portions of the surface depicted in each image.

In some embodiments, process 1000 can identify the minimum set of images based on a target resolution for the composite image. For example, based on the size of each image, and the resolution of the images (e.g., in pixels/mm), process 1000 can identify a number of images that can be used to generate an image with a minimum resolution (e.g., 150 dots per inch, or about 6 pixels per mm).

At 1008, process 1000 can remove the redundant internal images that are not in a minimum set of images that can be used to generate a composite image of the side of the object to generate a subset of images that can be used to generate the composite image.

Figure 11:
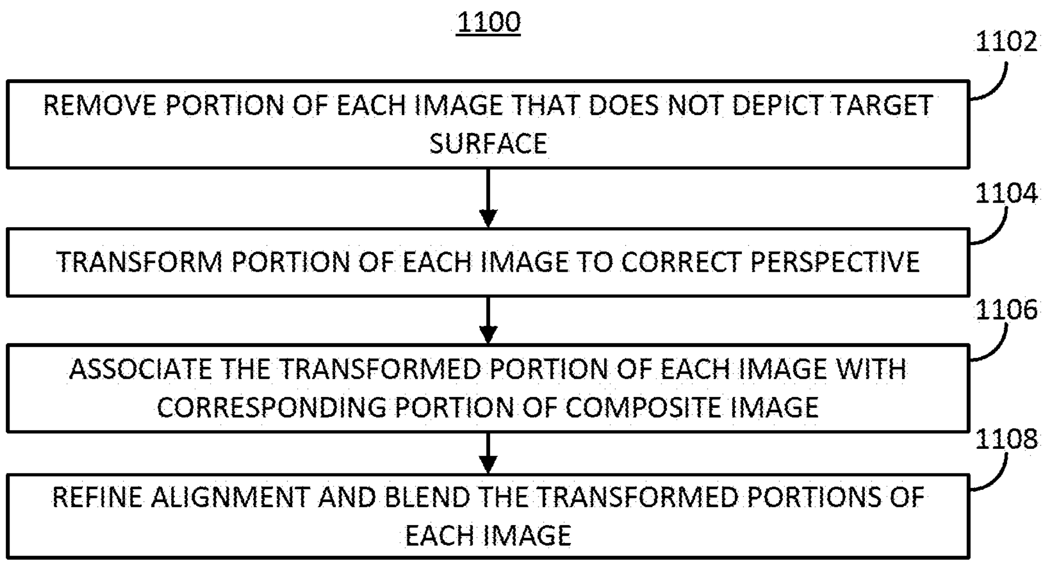
FIG. 11 shows an example of a process for generating a composite image of a surface of an object from multiple images of the surface with reduced distortion in accordance with some embodiments of the disclosed subject matter.

FIG. 11 shows an example 1100 of a process for generating a composite image of a surface of an object from multiple images of the surface with reduced distortion in accordance with some embodiments of the disclosed subject matter.

At 1102, process 1100 can remove a portion to each image that does not correspond to the target surface using any suitable technique or combination of techniques. For example, process 1100 can crop portions of the image that do not correspond to the target surface. As another example, process 1100 can copy image data from the portion of the image that does correspond to the target surface.

At 1104, process 1100 can transform a portion of each image corresponding to the target surface to a correct perspective using any suitable technique or combination of techniques. For example, process 1100 can find a 3×3 matrix (e.g., with eight unknowns) based on the location of 4 points in the image (e.g., based on the 3D location of the corners of the object) and the location of those 4 points in an image without perspective (e.g., (0,0), (width in mm×resolution in pixels/mm, 0), (0, length×resolution), and (width×resolution, length×resolution)). For example, as shown in FIG. 12B, a transformation can be determined using the four corners, and then can be applied to the image data to correct perspective in the image.

At 1106, process 1100 can associate the transformed portion of each image with the correct corresponding portion of the composite image based on the known position of the image with respect to the corners of the object. For example, process 1100 can determine where to place the transformed image based on the 2D location of the corners of that side of the object with respect to the portion of the surface included in the image.

In some embodiments, process 1100 can place the portions of each image into at least a rough alignment based on the portion of the surface depicted in the image, and the 2D location of the corners of the image.

At 1108, process 1100 can refine an alignment between portions of the image using image analysis techniques, and/or process 1100 can blend adjacent portions of the composite image to improve an image quality of the composite image.

In some embodiments, process 1100 can refine an alignment between portions of the composite image that were generated from different images using image processing techniques that utilize the content of the images. For example, process 1100 can attempt to refine an alignment between two portions of the image (e.g., starting from a reference point, such as a particular corner) by determining a cross-correlation between portions of different images. Note that this is merely an example, and many alignment techniques can be used.

Additionally or alternatively, in some embodiments, process 1100 can blend two portions of images to create a more uniform (e.g., less noisy) composite image. In some embodiments, process 1100 can blend two adjacent portions of an image using any suitable technique or combination of techniques, such as performing a weighted average of pixel intensity (e.g., for monochromatic images) in an overlapping region, or any other suitable blending technique(s). For example, an area to be blended can be associated with weights that change gradually along a gradient from one image to another (e.g., from 99/1 at one edge closes to a first image, to 50/50 in the center, to 1/99 at the second edge). Note that blending between more than two images can be performed (e.g., using more than two weights) weighted toward the closer image, such that in a center with a gradient that decreases. As described below, in some embodiments, blending can be preferentially performed in regions with relatively low information content (e.g., regions that do not include a barcode, an address, another type of label, another type of symbol, etc.).

In some embodiments, process 1100 can select which portion of an image to use to represent a particular portion of the surface based on the presence (or absence) of important information, such as a symbol, text, a logo, etc. For example, process 1100 (or another process) can attempt to locate portions of the image with high information content compared to other portions of the image, and can determine which of multiple overlapping portions of different images to include in the composite image based on how close the portion with high information content is to an edge of the portion of the image. For example, if a barcode (or other symbol) is partially included in a first image, and fully included in a second image, process 1100 can select the portion of the second image that includes the barcode (or other symbol) for inclusion in the composite image. This may improve the retention of information in the composite image, as high information content portions of the image can be placed without performing operations that may adversely impact image quality (e.g., blending). Additionally or alternatively, in some embodiments, process 1100 can align regions with high information content more precisely, and/or can generate a super-resolution image of a high information content region (e.g., as described above in connection with 710 of FIG. 7). Process 1100 can, for example, use information indicating which portion(s) of an image is likely to have high information content to determine which portion or portions of the image to process to generate a super-resolution version, and can omit such processing on other portions of the image (e.g., low information portions).

In some embodiments, blending can be performed in a relatively narrow area where the images overlap. For example, a band of a hundred pixels (or any other suitable number of pixels) can be identified in a region where the images overlap (e.g., where there is low information content, in a center, etc.), and blending can be performed in that narrow region. In such an example, the overlapping portions that fall outside the narrow region can be weighted to 100/0 and 0/100, or can be clipped and removed prior to blending.

Figure 12A:
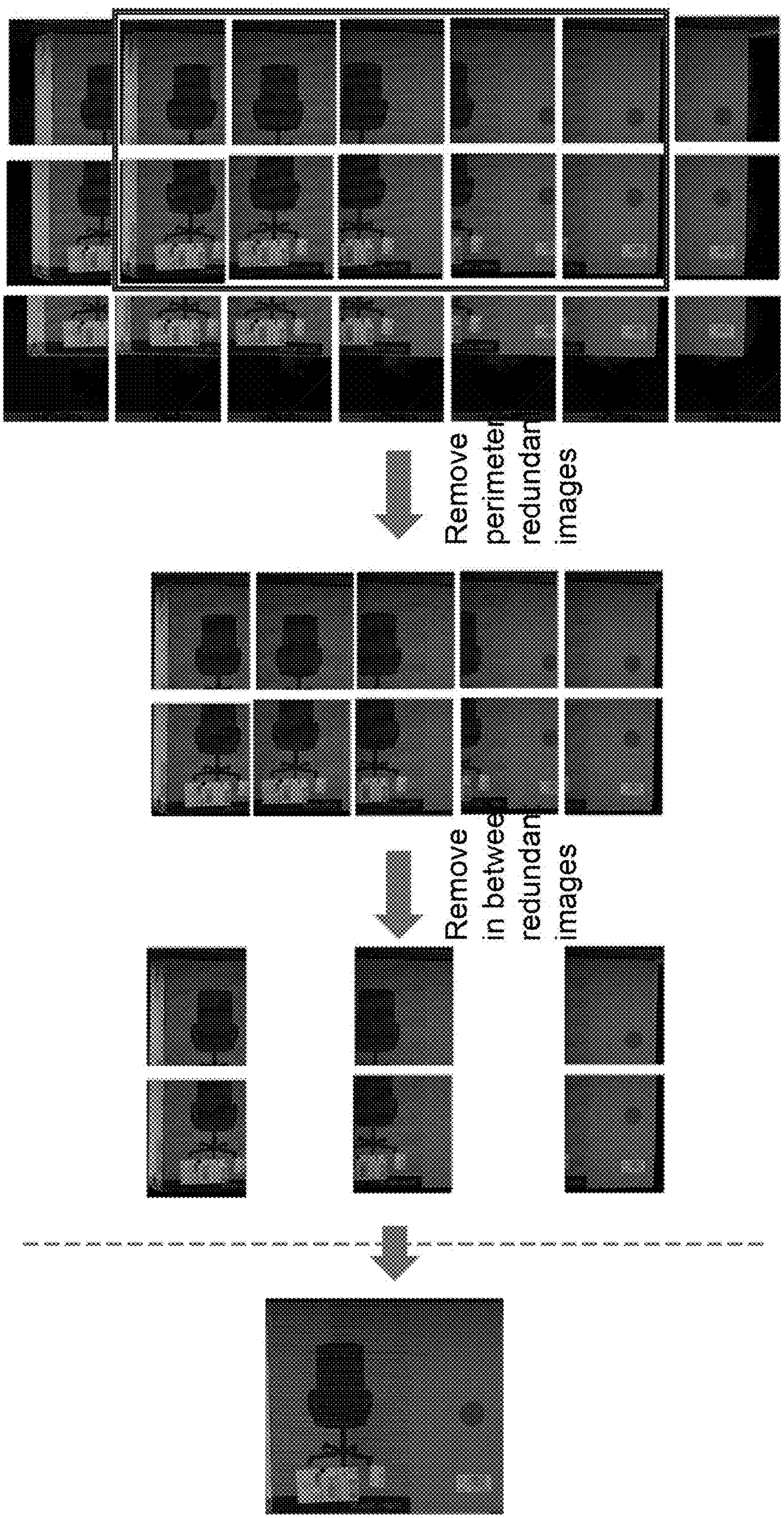
FIG. 12A shows an example of operations to select images useable to generate an image of a surface of an object from multiple images of the surface of the object in accordance with some embodiments of the disclosed subject matter.
Figure 12B:
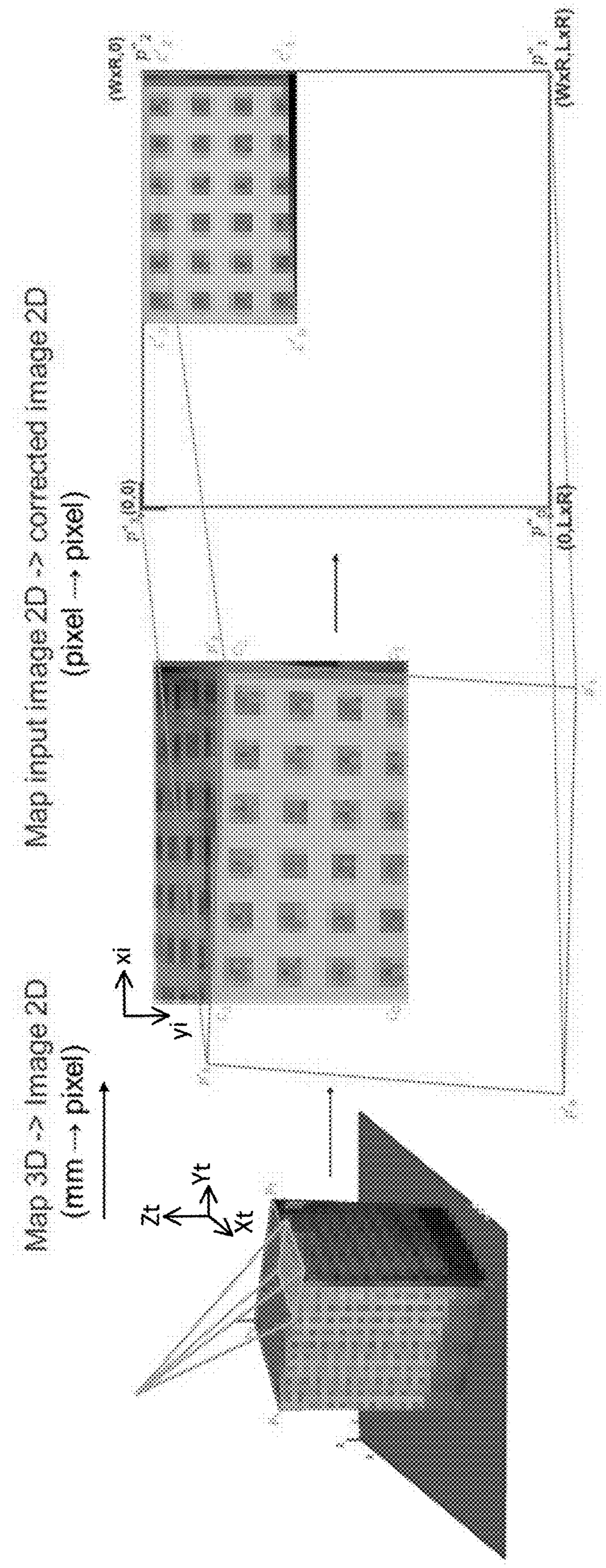
FIG. 12B shows an example of operations to identify a portion of an image corresponding to a target surface of an object, removing portions of the image that do not correspond to the target surface, and aligning the image of the target surface to a composite image in accordance with some embodiments of the disclosed subject matter.

FIG. 12A shows an example of operations to select images useable to generate an image of a surface of an object from multiple images of the surface of the object in accordance with some embodiments of the disclosed subject matter.

In FIG. 12A, a grid of 21 images each covering different portions of a box (e.g., captured by an imaging device using a steerable mirror). As described above in connection with FIG. 10, a system can identify images within the grid that include an edge and the largest amount of surface. In the example of FIG. 12, the second image in the middle column includes two edges and a large amount of surface area. Accordingly, that image is selected over the first image in the middle column and the first two images in the left column. Similarly, the penultimate image in the middle column includes two edges, and a large amount of surface area. Note that while the third image in the middle column includes more of the surface, it does not include an edge, and accordingly selecting that image may risk excluding a portion of the surface.

As shown in FIG. 12A, a block of images that includes the images with the most surface and each edge can be preliminary selected by removing perimeter images that include less surface than the images in the block. For example, in FIG. 12A, the portion of the surface included in images from the left column are all included in the images from the middle column, and thus those images do not include any image content that is necessary to generate the composite image.

After removing the perimeter redundant images (and any images that do not include any portion of the surface), redundant interior images can be removed from consideration for use in generating the composite image. For example, in FIG. 12A, the $3^{rd}$ image in each column after removing the redundant perimeter images overlap least with the images that include the top and bottom (direction within FIG. 12A, not necessarily in the tunnel coordinate space) edges. These two images can be selected for use in generating the composite image because they include portions of the surface not included in the perimeter images. Accordingly, because the $2^{nd}$ and $4^{th}$ images only include redundant portions of the surface, those images can be removed as well, six of the original 21 images can be selected for use in generating the composite image without performing analysis of the content of the images. For example, the decisions can be based entirely on the information about the location of the box with respect to each image.

FIG. 12B shows an example of operations to identify a portion of an image corresponding to a target surface of an object, removing portions of the image that do not correspond to the target surface, and aligning the image of the target surface to a composite image in accordance with some embodiments of the disclosed subject matter.

As shown in FIG. 12B, 3D locations of each corner of a box can be mapped to 2D points in an image of the box. The correspondence between a target surface of the box and the image can be used to clip a portion of the image that includes the target surface, while discarding a portion of another surface of the box and any background.

The clipped region can be transformed (e.g., warped) to correct the perspective of the image such that the corrected image on the right appears to have been captured without perspective distortion. The corrected image can be aligned with the outline of the target surface based on the mapping of the 3D points to the 2D image space, as shown in FIG. 12B.

Further Examples Having a Variety of Features:

Implementation examples are described in the following numbered clauses:

1. A method for generating images of one or more sides of an object, comprising: (i) receiving information indicative of a three dimensional (3D) pose of a first object in a first coordinate space at a first time; (ii) receiving a group of images captured using at least one image sensor associated with one or more surfaces of the object, wherein each image is associated with a field of view within the first coordinate space; (iii) mapping, for each image of the group of images, at least a portion of a surface of the first object to a 2D area with respect to the image based on the information indicative of the 3D pose of the first object in the first coordinate space; (iv) associating, for each image of the group of images that includes at least a portion of the surface of the first object within the image, a portion of that image with the surface of the first object based on the 2D area; and (v) generating a composite image of the surface of the first object using a set of images associated with the surface of the first object.

2. The method of clause 1, further comprising: repeating (i) to (v) for a multitude of objects.

3. The method of clause 2, wherein the multitude of objects are objects conveyed past the at least one imaging device via a conveyor.

4. The method of any one of clauses 1 to 3, further comprising: repeating (ii) through (iv) for multiple surfaces of the first object.

5. The method of any one of clauses 1 to 4, wherein mapping the portion of the surface of the first object to the 2D area with respect to the image comprises: mapping a 3D location of a plurality of corners of the first object to a 2D location with respect to the image based on the information indicative of the 3D pose of the first object in the first coordinate space; and determining a portion of the image corresponding to the surface based on the 3D locations of the plurality of corners.

6. The method of any one of clauses 1 to 5, wherein mapping the portion of the surface of the first object to the 2D area with respect to the image comprises transforming at least one 3D location in the first coordinate space into a 2D location in an image coordinate space associated with an image in the group of images.

7. The method of any one of clauses 1 to 6, wherein receiving information indicative of the 3D pose of the first object comprises a 3D location of at least one corner of the first object in the first coordinate space.

8. The method of any one of clauses 1 to 7, further comprising receiving information indicative of dimensions of the first object.

9. The method of any one of clauses 1 to 8, wherein the information indicative of the 3D pose of the first object is received from a dimensioning system.

10. The method of any one of clauses 1 to 6, wherein the information indicative of the 3D pose of the first object comprises point cloud data.

11. The method of any one of clauses 1 to 10, further comprising: selecting, from the group of images, a set of images that include a particular surface of the object, wherein the set of images includes fewer images than the group of images.

12. The method of clause 11, wherein the set of images includes all images that include the particular surface of the object.

13. The method of clause 11, wherein the set of images includes fewer than all images that include the particular surface, and excludes at least one image of the group of images that includes the same portion of the particular surface that is depicted in an image in the set of images.

14. The method of any one of clauses 1 to 13, further comprising: generating a 3D model of the object based on information indicative of dimensions of the first object; associating each of the composite images with a face of the 3D model; and causing a visualization of the object to be presented.

15. The method of any one of clauses 1 to 14, further comprising: causing at least the images used to generate the composite image of each of multiple surfaces of first object to be saved in memory; causing a composite image of a first surface of the first object to be presented; receiving a selection of a portion the composite image of the first surface; and in response to the selection, causing each image of the images used to generate the composite image of first side to be presented.

16. The method of clause 15, wherein each portion of the composite image of the first surface is associated with information identifying which images saved in memory depict that portion of the first surface.

17. The method of any one of clauses 1 to 16, wherein generating the composite image of the surface of the first object using the set of images associated with that surface of the object comprises: removing a portion of each image of the set of images associated with the surface that do not depict the surface based on the information indicative of a 3D pose of the first object; transforming a portion of each image of the set of images associated with the surface that depicts the surface; associating the transformed portion of each image of the set of images with a corresponding portion of the composite image; and refining an alignment of the transformed portions of the images based on image data of the transformed portions.

18. The method of clause 17, further comprising: blending portions of transformed portions of images based on image data of the transformed portions.

19. A system for generating images of one or more sides of an object, comprising: at least one hardware processor that is programmed to: (i) receive information indicative of a three dimensional (3D) pose of a first object in a first coordinate space at a first time; (ii) receive a group of images captured using at least one image sensor associated with one or more surfaces of the object, wherein each image is associated with a field of view within the first coordinate space; (iii) map, for each image of the group of images, at least a portion of a surface of the first object to a 2D area with respect to the image based on the information indicative of the 3D pose of the first object in the first coordinate space; (iv) associate, for each image of the group of images that includes at least a portion of the surface of the first object within the image, a portion of that image with the surface of the first object based on the 2D area; and (v) generate a composite image of the surface of the first object using a set of images associated with the surface of the first object.

20. The system of clause 19, further comprising: an imaging device comprising the at least one image sensor, wherein the imaging device is programmed to: capture a plurality of images; and transmit the plurality of images to a computing device comprising the at least one hardware processor.

21. The system of any one of clauses 19 to 20, further comprising: a dimensioning device that is programmed to: determine dimensions and a location of an object supported by a support structure; calculate locations of corners of the object in the first coordinate space; and transmit the locations of corners of the object in the first coordinate space to a computing device comprising the at least one processor.

22. The system of any one of clauses 19 to 21, wherein the at least one processor is further programmed to: repeat (i) to (v) for a multitude of objects.

23. The system of clause 22, wherein the multitude of objects are objects conveyed past the at least one imaging device via a conveyor.

24. The system of any one of clauses 19 to 23, wherein the at least one processor is further programmed to: select, from the group of images, a set of images that include a particular surface of the object, wherein the set of images includes fewer images than the group of images.

25. A system for generating images of one or more sides of an object, comprising: at least one processor that is configured to: perform a method of any of clauses 1 to 18.

26. A non-transitory computer readable medium containing computer executable instructions that, when executed by a processor, cause the processor to perform a method for generating images of one or more sides of an object, the method comprising: (i) receiving information indicative of a three dimensional (3D) pose of a first object in a first coordinate space at a first time; (ii) receiving a group of images captured using at least one image sensor associated with one or more surfaces of the object, wherein each image is associated with a field of view within the first coordinate space; (iii) mapping, for each image of the group of images, at least a portion of a surface of the first object to a 2D area with respect to the image based on the information indicative of the 3D pose of the first object in the first coordinate space; (iv) associating, for each image of the group of images that includes at least a portion of the a surface of the first object within the image, a portion of that image with the surface of the first object based on the 2D area; and (v) generating a composite image of the surface of the first object using a set of images associated with the surface of the first object.

27. A non-transitory computer-readable medium storing computer-executable code, comprising code for causing a computer to cause a processor to: perform a method of any of clauses 1 to 19.

28. A method for generating a composite image of a surface of an object, comprising: receiving a plurality of images of one or more surfaces of an object, wherein each image is associated with a field of view within a first coordinate space; mapping, for each image of the plurality of images, at least a portion of the object from 3D coordinates in the first coordinate space to 2D coordinates within the image; associating, for each image of the plurality of images, a portion of that image with a surface of the object based on the location of a corner of the object within the image; and generating a composite image of the surface of the object using the portions of the images associated with the surface of the object.

29. The method of clause 27, further comprising receiving information indicative of a 3D pose of the first object comprises a 3D location of at least one corner of the first object in the first coordinate space.

30. The method of clause 27, further comprising: determining information indicative of a 3D pose of the first object using point cloud data; and determining a 3D location of at least one corner of the first object in the first coordinate space.

31. The method of clause 30, further comprising: receiving the point cloud data; and determining the information indicative of the 3D pose of the first object using the point cloud data.

32. The method of any one of clauses 28 to 31, further comprising: capturing, using an imaging device, a group of images comprising the plurality of images and a second plurality of images; receiving, at the imaging device, information indicative of a 3D pose of the first object comprises a 3D location of at least one corner of the first object in the first coordinate space; mapping the 3D location of at least one corner of the object to a 2D location within the image using a processor of the imaging device; selecting, from the group of images, the plurality of images based at least in part on inclusion of a particular surface of the object, wherein the second plurality of images do not include the particular surface of the object; and transmitting the plurality of images to a computing device configured to generate the composite image of the surface.

33. The method of clause 28, further comprising: receiving, at the imaging device, information indicative of a 3D pose of the first object comprising a 3D location of at least one corner of the first object in the first coordinate space; mapping the 3D location of at least one corner of the object to a 2D location within the a field of view of an imaging device; selectively capturing, using the imaging device, the plurality of images using the information indicative of the 3D pose, such that each of the plurality of images includes at least a portion of the first object; and transmitting the plurality of images to a computing device configured to generate the composite image of the surface.

34. The method of any one of clauses 28 to 33, wherein the object is a box having six surfaces and eight corners.

35. The method of any one of clauses 28 to 33, wherein the object is an envelope having two surfaces and four corners.

36. The method of clause 35, wherein at least one of the two surfaces has a 3D shape.

37. The method of any one of clauses 28 to 36, wherein the information indicative of the 3D pose of the first object is generated by a dimensioning system.

38. The method of any one of clauses 28 to 36, further comprising receiving information indicative of dimensions of the first object.

39. The method of any one of clauses 28 to 30 or 33 to 38, wherein the plurality of images are received as part of a group of images that includes a second plurality of images; wherein the method further comprises: selecting, from the group of images, the plurality of images that each include a particular surface of the object, wherein the set of images includes fewer images than the group of images.

40. The method of any one of clauses 28 to 39, further comprising: generating a 3D model of the object based on information indicative of dimensions of the first object; associating the composite image of the surface with a face of the 3D model; and causing a visualization of the object to be presented.

41. The method of any one of clauses 28 to 40, further comprising: causing at least the images used to generate the composite image to be saved in memory;

causing the composite image to be presented; receiving a selection of a portion the composite image of the first surface; and in response to the selection, causing each image of the images used to generate the composite image of first side to be presented.

42. A system for generating a composite image of a surface of an object, comprising: at least one hardware processor that is programmed to: receive a plurality of images of one or more surfaces of an object, wherein each image is associated with a field of view within a first coordinate space; map, for each image of the plurality of images, at least a portion of the object from 3D coordinates in the first coordinate space to 2D coordinates within the image; associate, for each image of the plurality of images, a portion of that image with a surface of the object based on the location of a corner of the object within the image; and generate a composite image of the surface of the object using the portions of the images associated with the surface of the object.

43. The system of clause 42, further comprising: an imaging device comprising at least one image sensor, wherein the imaging device is programmed to: capture the plurality of images; and transmit the plurality of images to a computing device comprising the at least one hardware processor.

44. The system of any one of clauses 42 to 43, further comprising: a dimensioning device that is programmed to: determine dimensions and a location of an object supported by a support structure; calculate locations of corners of the object in the first coordinate space; and transmit the locations of corners of the object in the first coordinate space to a computing device comprising the at least one processor.

45. The system of any one of clauses 42 to 44, wherein the at least one processor is further programmed to: generate composite images of the surfaces of a multitude of objects.

46. The system of clause 45, wherein the multitude of objects are objects conveyed past at least one imaging device that captures images via a conveyor.

47. A system for generating a composite image of a surface of an object, comprising: at least one processor that is configured to: perform a method of any of clauses 28 to 41.

48. A non-transitory computer readable medium containing computer executable instructions that, when executed by a processor, cause the processor to perform a method for generating a composite image of a surface of an object, the method comprising: receiving a plurality of images of one or more surfaces of an object, wherein each image is associated with a field of view within a first coordinate space; mapping, for each image of the plurality of images, at least a portion of the object from 3D coordinates in the first coordinate space to 2D coordinates within the image; associating, for each image of the plurality of images, a portion of that image with a surface of the object based on the location of a corner of the object within the image; and generating a composite image of the surface of the object using the portions of the images associated with the surface of the object.

49. A non-transitory computer-readable medium storing computer-executable code, comprising code for causing a computer to cause a processor to: perform a method of any of clauses 28 to 19.

In some embodiments, any suitable computer readable media can be used for storing instructions for performing the functions and/or processes described herein. For example, in some embodiments, computer readable media can be transitory or non-transitory. For example, non-transitory computer readable media can include media such as magnetic media (such as hard disks, floppy disks, etc.), optical media (such as compact discs, digital video discs, Blu-ray discs, etc.), semiconductor media (such as RAM, Flash memory, electrically programmable read only memory (EPROM), electrically erasable programmable read only memory (EEPROM), etc.), any suitable media that is not fleeting or devoid of any semblance of permanence during transmission, and/or any suitable tangible media. As another example, transitory computer readable media can include signals on networks, in wires, conductors, optical fibers, circuits, or any suitable media that is fleeting and devoid of any semblance of permanence during transmission, and/or any suitable intangible media.

It should be noted that, as used herein, the term mechanism can encompass hardware, software, firmware, or any suitable combination thereof.

Although the invention has been described and illustrated in the foregoing illustrative embodiments, it is understood that the present disclosure has been made only by way of example, and that numerous changes in the details of implementation of the invention can be made without departing from the spirit and scope of the invention, which is limited only by the claims that follow. Features of the disclosed embodiments can be combined and rearranged in various ways.

What is claimed is:

1. A method for generating images of one or more sides of an object, comprising:

(i) receiving pose information indicative of a three dimensional (3D) pose of an object in a 3D first coordinate space;

(ii) receiving a group of images captured using at least one image sensor, wherein the group of images includes an object surface of the object;

(iii) mapping, for each image of the group of images, the object surface from the 3D first coordinate space to a two-dimensional (2D) second coordinate space of the image, based on the pose information;

(iv) selecting, from the group of images, a set of images that includes the object surface;

(v) associating, for each image of the set of images, at least a portion of that image with the object surface based on the 2D second coordinate space of the image; and (vi) generating a composite image of the object surface in a 2D third coordinate space by transforming the at least a portion of each image of the set of images from the 2D second coordinate space to a corresponding portion of the composite image in the 2D third coordinate space.

2. The method of claim 1, wherein the selecting is based on the presence of a high information content region.

3. The method of claim 2, wherein the high information content region comprises at least one of a symbol, a text, a label, an address, or a logo.

4. The method of claim 1, wherein generating the composite image comprises generating the composite image as a super-resolution composite image with at least a first portion having a higher resolution than the set of images.

5. The method of claim 4, wherein the selecting is further based on the presence of a high information content region.

6. The method of claim 5, wherein the first portion corresponds to the high information content region.

7. The method of claim 6, wherein the high information content region comprises at least one of a symbol, a text, a label, an address, or a logo.

8. The method of claim 6, wherein a second portion of the super-resolution composite image corresponds to a low information content region.

9. The method of claim 8, wherein the second portion is a lower resolution than the first portion.

10. The method of claim 1, wherein generating the composite image by transforming the at least a portion of each image of the set of images comprises:

removing a first portion of each image of the set of images that does not depict the object surface, based on the pose information of the object;

transforming a second portion of each image of the set of images that depicts the object surface;

associating the transformed second portion of each image of the set of images with a corresponding portion of the composite image; and refining an alignment of the transformed portions of the images based on image data of the transformed portions.

11. The method of claim 10, further comprising:

blending portions of the transformed portions of the images based on image data of the transformed portions.

12. The method of claim 11, wherein blending the portions of the transformed portions includes blending regions of the transformed portions having low information content.

13. The method of claim 12, wherein low information content corresponds to the absence of a symbol, a text, a label, an address, or a logo.

14. A system for generating images of one or more sides of an object, comprising:

an imaging device comprising an image sensor with a corresponding field-of-view (FOV) configured to acquire images of an object within the FOV; and at least one processor in communication with the imaging device and configured to:

(i) receive pose information indicative of a three dimensional (3D) pose of the object in a 3D first coordinate space;

(ii) receive a group of images acquired by the imaging device, wherein the group of images includes an object surface of the object;

(iii) map, for each image of the group of images, the object surface from the 3D first coordinate space to a two-dimensional (2D) second coordinate space of the image, based on the pose information;

(iv) select, from the group of images, a set of images that includes the object surface;

(v) associate, for each image of the set of images, at least a portion of that image with the object surface based on the 2D second coordinate space of the image; and (vi) generate a composite image of the object surface in a 2D third coordinate space by transforming the at least a portion of each image of the set of images from the 2D second coordinate space to a corresponding portion of the composite image in the 2D third coordinate space.

15. The system of claim 14, wherein the at least one processor is configured to select the set of images based on the presence of a high information content region comprising at least one of a symbol, a text, a label, an address, or a logo.

16. The system of claim 14, wherein the at least one processor is configured to generate the composite image by generating a super-resolution composite image with at least a first portion having a higher resolution than the set of images.

17. The system of claim 14, wherein the at least one processor is configured to generate the composite image by:

removing a first portion of each image of the set of images that does not depict the object surface based on the pose information of the object;

transforming a second portion of each image of the set of images that depicts the object surface;

associating the transformed second portion of each image of the set of images with a corresponding portion of the composite image;

refining an alignment of the transformed portions of the images based on image data of the transformed portions; and blending portions of the transformed portions of images based on image data of the transformed portions.

18. The system of claim 17, wherein blending the portions of the transformed portions includes blending regions of the transformed portions having an absence of a symbol, a text, a label, an address, or a logo.

19. The system of claim 14, wherein the at least one processor is configured to select the set of images based on identifying a minimum set of images that collectively covers an entirety of the object surface.

20. The system of claim 14, wherein the imaging device is configured to acquire the images of the object while the object is in relative motion with respect to the FOV.

* * * * *